(12) United States Patent
Zou et al.

(10) Patent No.: US 8,340,979 B2
(45) Date of Patent: *Dec. 25, 2012

(54) SYSTEMS AND METHODS FOR ELECTRONICALLY PROCESSING GOVERNMENT SPONSORED BENEFITS

(75) Inventors: Kevin Zou, Austin, TX (US); Josh A. Wiles, Round Rock, TX (US); Pasquale Solitro, Round Rock, TX (US); Zheng Zhu, Austin, TX (US)

(73) Assignee: ACS State & Local Solutions, Inc., Washington, DC (US)

( * ) Notice: Subject to any disclaimer, the term of this patent is extended or adjusted under 35 U.S.C. 154(b) by 1192 days.

This patent is subject to a terminal disclaimer.

(21) Appl. No.: 10/379,733

(22) Filed: Mar. 6, 2003

(65) Prior Publication Data

US 2004/0064332 A1  Apr. 1, 2004

Related U.S. Application Data

(60) Provisional application No. 60/414,645, filed on Oct. 1, 2002.

(51) Int. Cl.
*G06Q 10/00* (2012.01)
(52) U.S. Cl. .................................... 705/1.1
(58) Field of Classification Search .................. 705/1
See application file for complete search history.

(56) References Cited

U.S. PATENT DOCUMENTS

| | | | |
|---|---|---|---|
| 4,341,951 A | 7/1982 | Benton | |
| 5,457,747 A * | 10/1995 | Drexler et al. | 713/186 |
| 5,461,217 A | 10/1995 | Claus | |
| 5,479,510 A | 12/1995 | Olsen et al. | |
| 5,530,855 A | 6/1996 | Satoh et al. | |
| 5,536,045 A * | 7/1996 | Adams | 283/67 |
| 5,559,887 A | 9/1996 | Davis et al. | |
| 5,577,121 A | 11/1996 | Davis et al. | |
| 5,640,561 A | 6/1997 | Satoh et al. | |
| 5,737,539 A | 4/1998 | Edelson et al. | 395/203 |
| 5,864,822 A * | 1/1999 | Baker, III | 705/14 |
| 5,924,094 A | 7/1999 | Sutter | |
| 5,930,759 A | 7/1999 | Moore et al. | 705/2 |

(Continued)

FOREIGN PATENT DOCUMENTS

EP  0088639 A3  12/1984

(Continued)

OTHER PUBLICATIONS

USDA (US Department of Agriculture), www.fns.usda.gov, obtained from Internet Archive Wayback Machine <www.archive.org>, Date Range: Aug. 3-24, 2002.*

(Continued)

*Primary Examiner* — Jonathan Ouellette
(74) *Attorney, Agent, or Firm* — Finnegan, Henderson, Farabow, Garrett & Dunner, LLP

(57) ABSTRACT

Systems and methods for processing benefits include providing a graphical user interface, such as a web browser, to a benefit recipient for accessing at least account information concerning at least one benefit type. The benefits processing system may receive a request from the benefit recipient through the graphical user interface for displaying the at least account information concerning the at least one benefit type. The benefits processing system may then display the at least account information through the graphical user interface concerning the at least one benefit type.

20 Claims, 27 Drawing Sheets

U.S. PATENT DOCUMENTS

| | | | |
|---|---|---|---|
| 5,953,709 A | 9/1999 | Gilbert et al. | |
| 5,953,719 A | 9/1999 | Kleewein et al. | |
| 5,991,742 A | 11/1999 | Tran | |
| 6,014,635 A | 1/2000 | Harris et al. | |
| 6,061,660 A | 5/2000 | Eggleston et al. | |
| 6,067,522 A | 5/2000 | Warady et al. | 705/2 |
| 6,112,182 A | 8/2000 | Akers et al. | 705/2 |
| 6,115,715 A | 9/2000 | Traversat et al. | |
| 6,129,275 A | 10/2000 | Urquhart et al. | |
| 6,169,974 B1 | 1/2001 | Baumgartner et al. | |
| 6,189,011 B1 | 2/2001 | Lim et al. | 707/102 |
| 6,199,074 B1 | 3/2001 | Kern et al. | |
| 6,230,145 B1 | 5/2001 | Verderamo et al. | |
| 6,233,617 B1 | 5/2001 | Rothwein et al. | 709/227 |
| 6,266,648 B1* | 7/2001 | Baker, III | 705/14 |
| 6,282,522 B1 | 8/2001 | Davis et al. | 705/41 |
| 6,299,062 B1 | 10/2001 | Hwang | 235/379 |
| 6,343,271 B1 | 1/2002 | Peterson et al. | 705/4 |
| 6,401,079 B1 | 6/2002 | Kahn et al. | |
| 6,446,089 B1 | 9/2002 | Brodersen et al. | 707/201 |
| 6,446,092 B1 | 9/2002 | Sutter | |
| 6,615,190 B1 | 9/2003 | Slater | |
| 6,616,189 B2 | 9/2003 | Raming | |
| 6,694,447 B1* | 2/2004 | Leach et al. | 714/6 |
| 6,766,302 B2 | 7/2004 | Bach | |
| 6,808,111 B2 | 10/2004 | Kashef et al. | |
| 6,873,995 B2 | 3/2005 | Laue et al. | |
| 6,896,618 B2 | 5/2005 | Benoy et al. | |
| 6,915,265 B1 | 7/2005 | Johnson | |
| 6,999,936 B2 | 2/2006 | Sehr | |
| 7,039,593 B2 | 5/2006 | Sager | |
| 7,054,838 B2 | 5/2006 | Sutton et al. | |
| 7,083,084 B2 | 8/2006 | Graves et al. | |
| 7,136,835 B1 | 11/2006 | Flitcroft et al. | |
| 7,149,724 B1 | 12/2006 | Flanagan et al. | |
| 7,165,049 B2 | 1/2007 | Slater | |
| 7,174,315 B2 | 2/2007 | Phillips et al. | |
| 7,206,805 B1 | 4/2007 | McLaughlin, Jr. | |
| 7,222,097 B2 | 5/2007 | Bellosguardo | |
| 7,290,056 B1 | 10/2007 | McLaughlin, Jr. | |
| 7,319,986 B2 | 1/2008 | Praisner et al. | |
| 2001/0034702 A1 | 10/2001 | Mockett et al. | |
| 2001/0047286 A1 | 11/2001 | Walker et al. | |
| 2001/0049636 A1 | 12/2001 | Hudda et al. | |
| 2002/0010679 A1 | 1/2002 | Felsher | 705/51 |
| 2002/0026329 A1 | 2/2002 | Saito et al. | |
| 2002/0091635 A1* | 7/2002 | Dilip et al. | 705/39 |
| 2002/0107849 A1* | 8/2002 | Hickey et al. | 707/3 |
| 2002/0156676 A1* | 10/2002 | Ahrens et al. | 705/14 |
| 2003/0009355 A1 | 1/2003 | Gupta | 705/2 |
| 2003/0069750 A1 | 4/2003 | Siegel et al. | |
| 2003/0074234 A1 | 4/2003 | Stasny | 705/4 |
| 2003/0093283 A1* | 5/2003 | Morsa | 705/1 |
| 2003/0101136 A1 | 5/2003 | Wheeler et al. | 705/42 |
| 2003/0163755 A1* | 8/2003 | Fung et al. | 714/4 |
| 2003/0177150 A1* | 9/2003 | Fung et al. | 707/204 |
| 2003/0191669 A1 | 10/2003 | Fitzgerald et al. | |
| 2003/0216967 A1 | 11/2003 | Williams | |
| 2003/0225760 A1* | 12/2003 | Ruuth et al. | 707/5 |
| 2004/0006489 A1 | 1/2004 | Bynon | |
| 2004/0083173 A1 | 4/2004 | Reddihough et al. | |
| 2004/0093303 A1 | 5/2004 | Picciallo | |
| 2004/0128245 A1* | 7/2004 | Neal et al. | 705/40 |
| 2005/0125320 A1 | 6/2005 | Boesen | |
| 2006/0116960 A1 | 6/2006 | Gillin et al. | |
| 2006/0218206 A1 | 9/2006 | Bourbonnais et al. | |
| 2007/0061251 A1 | 3/2007 | Watkins | |
| 2007/0094047 A1 | 4/2007 | Sager | |

FOREIGN PATENT DOCUMENTS

| | | | |
|---|---|---|---|
| EP | 0216521 B1 | 11/1993 | |
| EP | 0493894 B1 | 3/1996 | |
| GB | 2323060 | 9/1998 | |
| JP | 06-032086 | 2/1994 | |
| WO | WO 96/25814 | 8/1996 | |
| WO | WO 96/41287 | 12/1996 | |
| WO | WO 97/10560 | 3/1997 | |
| WO | WO 97/17212 | 5/1997 | |
| WO | WO 97/30409 | 8/1997 | |
| WO | WO 97/39424 | 10/1997 | |
| WO | WO 97/41541 | 11/1997 | |
| WO | WO 98/05011 | 2/1998 | |
| WO | WO 99/06967 | 2/1999 | |
| WO | WO 0129708 | * 4/2001 | |

OTHER PUBLICATIONS www.ssa.gov, documents obtained from Internet Archive Wayback Machine <www.archive.org>, date range: Feb. 29, 2000-Mar. 4, 2000.*

International Search Report PCT/US03/29982, dated Jun. 21, 2004 (7 pages).

Joulia Dib et al., "Electronic Benefit Transfer (EBT) Programs: Best Practices to Serve Recipients," Goldman School of Public Policy, University of California at Berkeley, Aug. 2000, pp. i-v and 1-93.

Sanders, B. "New Electronic Systems Let Your Fingers do the Banking," New Hampshire Business Review, vol. 18, No. 7, pp. 1-5, Mar. 29, 1996.

"Broadbase Software, BroadVision, Interwoven and Verity Create State-of-the-Art Portal for the State of California," Business Wire, Jan. 9, 2001.

"Creating the Digital Citizen," Business and Finance, May 10, 2001.

Bowen, C. "Welfare Agencies seek Benefits from Chip Cards," Card Technology, vol. 7, No. 1, pp. 40-44, Jan. 2002.

Bellare, M., "VarietyCash: A Multi-purpose Electronic Payment System," Proceedings of the 3rd USENIX Workshop on Electronic Commerce, Aug. 31-Sep. 3, 1998, pp. 9-24 (18 pages).

Burmansson, Frank, "Travel Cards in the Year 2000: The Helsinki Region Ushers in the Smart Card Era," Urban Public Transportation Systems, Proceedings of the First International Conference, Committee on Public Transport, Urban Transportation Division, ASCE, Mar. 21-25, 1999, pp. 229-239 (10 pages).

Block, Valerie, "Belgians Promoting Their Smart Card in U.S. (BANKSYS)," American Banker, vol. 160, No. 156, Aug. 15, 1995 (2 pages).

Parker, "Visa International Charges Ahead With Stored-Value Card," InfoWorld, vol. 17, No. 42, p. 78, Oct. 16, 1995 (4 pages).

"American Express: Last Minute Shoppers Face Grim Reality," M2 Presswire, Dec. 17, 1999 (1 pages).

"An AmEx Stored-Value Quest Leads to a Disney Debit Card Pact," The Gale Group, Jun. 25, 1998 (3 pages).

Kline, Alan, "Calif. Bank Buys Control of Electronic Paycheck Firm Series: 9," American Banker, vol. 162, Iss. 204, p. 8, Oct. 22, 1997, New York, NY (2 pages).

Bell, Stephen, "Direct Electronic Cash—Coming Soon to a Store Near You," Independent Business Weekly, May 20, 1998, New Zealand (4 pages).

Wenninger, John et al., "The Electronic Purse," Federal Reserve Bank of New York, Current Issues in Economics and Finance, vol. 1, No. 1, Apr. 1995 (6 pages).

Jaben, Jan, "Finland Sprints Ahead with Smart Cards," Credit Collection News, Nov. 6, 1997 (4 pages).

Burger, Andrew, "Hong Kong: Smart Card Hotbed," The Gale Group, Jul. 1998 (7 pages).

Hansell, Saul, "Mastercard's 'Smart Card' Builds Support," The New York Times, Late Edition—Final, p. 3, col. 1, Dec. 5, 1996 (2 pages).

"A New Card Dispenser Gives the Unbanked a Debit Option," Debit Card News, Apr. 27, 1998 (2 pages).

"Prepay? It's in the Cards," The Gale Group, Apr. 1994 (3 pages).

"Report to the Congress on the Application of the Electronic Fund Transfer Act to Electronic Stored-Value Products," Board of Governors of the Federal Reserve System, Federal Research Board Publications, Mar. 1997, pp. 19-27 (13 pages).

"Smart Cards Finally Get Respect From U.S. Banks," Bank Network News, vol. 12, Iss. 7, p. 1, Aug. 26, 1993, Chicago (3 pages).

King, Julia, "Teen Buyers Now Have New Ways to Pay Online," Computerworld, 33, 43, ABI/INFORM Global, Oct. 25, 1999, p. 40 (1 page).

McGee, John, "Towards a Cashless Society," Business and Finance, Business and Finance Magazine, Nov. 27, 1997 (2 pages).

"Visa Introduces a Prepaid International Money Card," American Banker, Dec. 7, 1994 (3 pages).

Gregg, Leigh, "Will You Be Ready for E-Cash?," Credit Union Executive Journal, vol. 38, Iss. 1, Jan./Feb. 1998, p. 12 (4 pages).

"Business Plan," WallyCard.com, pp. 1-14 (retrieved from http://leeds-faculty.colorado.edu/ moyes/bplan/Samples/WallyCard/WallyCard.pdf on Sep. 8, 2008) (14 pages).

"Claimant Guide," Utah Department of Workforce Services Unemployment Insurance, pp. 1-20 (retrieved from http://jobs.utah.gov/ui/jobseeker/claimguide.asp on Sep. 8, 2008) (20 pages).

"A CBO Study, Emerging Electronic Methods for Making Retail Payments," The Congress of the United States, Congressional Budget Office, U.S. GPO, Jun. 1996 (62 pages).

"EMV Migration Economics—Comparing Native and MULTOS smart card choices," MULTOS, pp. 1-17 (retrieved from www.multos.com/downloads/Whitepaper_EMV_Migration_Economics_Platform_Comparison.pdf on Sep. 8, 2008) (17 pages).

"EMV: The Journey From Mag-Stripe to Chip Cards," Secure Payment (retrieved from http://www.silicon-trust.com/trends/tr_emv.html on Sep. 8, 2008) (5 pages).

Hancock, Diana et al., "Payment transactions, instruments, and systems: A survey," Journal of Banking & Finance 21 (1998) pp. 1573-1624 (52 pages).

Hargreaves, Margaret et al., "The Evaluation of the Expanded EBT Demonstration in Maryland, vol. 1: System Startup, Conversion and Expansion," May 1994 (retrieved from www.abtassociates.com/reports/D19940002.pdf on Sep. 8, 2008) (150 pages).

"Hypercom Partners with ACS to Deploy 15,000 ePic ICE 5500 Card Payment Terminals in Support of Texas EBT System," Business Wire, Jun. 13, 2000 (retrieved from http://findarticles.com/p/articles/mi_m0EIN/is_2000_June_13/ai_62696512 on Sep. 8, 2008) (3 pages).

Magid, Larry, "Credit Cards, Internet team up to give kids lessons in how to manage spending," The Mercury News, Family Tech (retrieved from http://www.larrysworld.com/articles/sjm_credicards.htm on Sep. 8, 2008) (3 pages).

McDonald, Noreen, "Multipurpose Smart Cards in Transportation: Benefits and Barriers to Use," Dec. 8, 2000, pp. 1-27 (retrieved from www.uctc.net/scripts/countdown.pl?630.pdf on Sep. 8, 2008) (27 pages).

Oliveira, Victor et al., "All Food Stamp Benefits to Be Issued Electronically," Food Assistance and Welfare Reform, Jan.-Apr. 1998, pp. 35-39 (5 pages).

PCT/US03/09931 SearCh Report dated Jan. 2, 2004 (8 pages).

"PocketCard," CardWeb.com, Jul. 22, 1999 (retrieved from www.cardweb.com/cardtrak/news/1999/july/22a.html on Sep. 8, 2008) (1 page).

"PocketCard Inc.'s Product Launch at Internet World Summer 99; High-Tech VISA Card Ends Expense Account Headaches," Business Wire, Jul. 21, 1999 (retrieved from http://findarticles.com/p/articles/mi_m0EIN/is_1999_July_21/ai_55217741 on Sep. 8, 2008) (4 pages).

"Pocketcard Visa, A new twist on teaching teens about credit," Epinions.com, Jun. 11, 2000 (retrieved from www99.epinions.com/finc-review-2C14-9FACA4F-39447D2B-prod5 on Sep. 8, 2008) (2 pages).

"Prepaid Cards," Working Group on EU Payment Systems, May 1994, republished on Dec. 21, 1997 (retrieved from http://jya.com/EU_prepaid_cards.html on Sep. 8, 2008) (11 pages).

"Security of Electronic Money," Committee on Payment and Settlement Systems and the Group of Computer Experts of the Central Banks of the Group of Ten Countries, Bank for International Settlements (Aug. 1996) (70 pages).

"Stored Value Cards: An Alternative for the Unbanked?," Federal Reserve Bank of New York, Jul. 2004 (retrieved from www.ny.frb.org/regional/stored_value_cards.html on Sep. 8, 2008) (5 pages).

"Stored Value Card Systems," Information for Bankers and Examiners, Bulletin to Chief Executive Officers of all National Banks, Department and Division Head, and all Examining Personnel, OCC 96-48, Sep. 10, 1996 (retrieved from www.occ.treas.gov/ftp/bulletin/96-48.txt on Sep. 8, 2008) (10 pages).

"Telephone Card Guide," KARS Unlimited (retrieved from www.kars-unlimited.com/svc_guide.htm on Sep. 8, 2008) (1 page).

Tual, Jean Pierre et al., "Electronic Commerce, Electronic Purse and Standardisation," MUST 97 (retrieved from www.jptual.club.fr/downloads/must197 on Sep. 8, 2008) (29 pages).

Turner, Nigel, "Bank Launches Salary Card," Smart Card News, Smart Card News Ltd., Brighton, England, vol. 8, No. 4, p. 71, Apr. 1999 (20 pages).

"Visa Latin American and Caribbean—The History of Visa," (retrieved from http://www.visalatam.com/e_aboutvisa/acerca_historia.jsp on Sep. 8, 2008) (1 page).

"Electronic Benefit Transfer—History," EBT History Page, Texas Health and Human Services Commission, (retrieved from www.hhsc.state.tx.us/providers/LoneStar/EBT/EBThistory.html on Sep. 4, 2008) (5 pages).

"Texas' EBT System, The Lone Star Card," The Texas Lone Star Card, Electronic Benefits Transfer and Public Policy, (retrieved from www.utexas.edu/lbj/21cp/ebt/lonestar.htm on Sep. 4,2008) (1 page).

"Electronic Benefits Transfer in the Public Sector," EBT in the Public Sector, Electronic Benefits Transfer and Public Policy, (retrieved from www.utexas.edu/lbj/21cp/ebt/publicsector.htm on Sep. 4, 2008) (1 page).

"Welfare Recipients are Joining the Age of Plastic," The New York Times, published Mar. 14, 1993 (retrieved from http://query.nytimes.com/gst/fullpage.html?res=9F0CE0D71E30F937A25750C0A965958260 on Thursday, Sep. 18, 2008) (4 pages).

Petersen, Jennifer, "Welfare with a Debit Card, States look to private firms to automate delivery of benefits," AllPolitics (retrieved from http://cnn.com/ALLPOLITICS/1998/08/12/ebt.monopoly/ on Sep. 18,2008) (7 pages).

Pack, Thomas, "Stored-value cards offer new way to pay, give banks new product to sell," Business First of Louisville, Friday, Oct. 22, 2004 (retrieved from http://louisville.bizjournals.com/louisville/stories/2004/10/25/story2.html and http://louisville.bizjournals.com/louisville/stories/2004/10/25/story2.html?page=2 on Sep. 22, 2008) (5 pages).

Williams, Karen, "Prepaid Cards in the Public Sector: A World of Possibilities, Electronic payment applications for central and local governments," Business Insight, eFunds Corporation (retrieved from www.efunds.com/web/pdf/EFDPPrepaidGovernment.pdf on Sep. 4, 2008) (6 pages).

Leyser, Barbara, "Selected Characteristics of State EBT Systems," Jun. 2001 (retrieved from www.consumerlaw.org/initiatives/electronic_benefits/content/ebt_summary_table.pdf on Sep. 4, 2008) (7 pages).

National Child Support Enforcement Association, NCSEA News, Summer 1997 Conference Edition, vol. XXVII, No. 3 (4 pages).

Complaint for Declaratory Judgment and Patent Infringement, *JPMorgan Chase & Co. et al.* v. *Affiliated Computer Services, Inc. et al.*; (U.S.D.C. Del., Apr. 2008) (33 pages).

Public Law 104-193—Aug. 22,1996, 110 STAT. 2105, 104th Congress (251 pages).

Office Action, dated Dec. 4, 2007, for U.S. Appl. No. 10/631,472, filed Jul. 30, 2003 (77 pages).

Office Action, dated Jul. 9, 2008, for U.S. Appl. No. 10/631,472, filed Jul. 30, 2003 (65 pages).

Office Action, dated Feb. 20, 2009, for U.S. Appl. No. 10/631,472, filed Jul. 30, 2003 (23 pages).

Office Action, dated Apr. 2, 2008, for U.S. Appl. No. 10/650,994, filed Aug. 29, 2003 (23 pages).

Office Action, dated Jan. 6, 2009, for U.S. Appl. No. 10/631,472, filed Jul. 30, 2003 (24 pages).

Notice of Allowance and Fees Due, dated Oct. 7, 2008, for U.S. Appl. No. 10/650,994, filed Aug. 29, 2003 (19 pages).

Notice of Allowance and Fees Due, dated Apr. 3, 2009, for U.S. Appl. No. 10/650,994, filed Aug. 29, 2003 (12 pages).

Office Action issued in U.S. Appl. No. 12/318,688 on Nov. 9, 2010 (19 pages).

Office Action issued in U.S. Appl. No. 12/318,688 on Apr. 27, 2011 (12 pages).

Final Office Action issued in U.S. Appl. No. 12/318,688 on Feb. 23, 2012 (15 pages).

Notice of Allowance mailed Jan. 25, 2012, in U.S. Appl. No. 12/941,395 (15 pages).

* cited by examiner

SYSTEMS AND METHODS FOR ELECTRONICALLY PROCESSING GOVERNMENT SPONSORED BENEFITS

DESCRIPTION

This application claims priority under 35 U.S.C. §119 based on U.S. Provisional Application No. 60/414,645, filed Oct. 1, 2002, the complete disclosure of which is incorporated herein by reference.

FIELD OF THE INVENTION

This invention is related to data management, and more particularly to a method and system for electronically processing government sponsored benefits.

BACKGROUND

Federal and state governments are responsible for protecting the welfare of its citizens. As a consequence, programs have been established that offer financial assistance or benefits to those citizens whose income meets or falls below the poverty line. For example, certain individuals or families may receive food stamps and/or other cash benefits (such as under the Temporary Assistance for Needy Families ("TANF") program) to supplement their income.

Overall in the United States, the number of individuals and families who participate in these programs is increasing. This increase in the number of participants in government sponsored benefits programs is creating a higher caseload, which is not manageable using the legacy systems, which have been used to manage benefits. Such systems have also been difficult to upgrade and connect with other systems and new programs because of the wide variety of legacy systems, including different programming languages, database systems, and operating systems.

In light of the aforementioned problems encountered by existing government sponsored benefits programs there is a need to provide better means for tracking and managing government sponsored cash and non-cash benefits.

SUMMARY

Methods and systems of the present invention enable needy families and individuals to more efficiently interact with the various government sponsored benefits programs. These methods and systems also permit administrators, retailers, and other entities involved with the electronic benefit transfer systems to better manage and use the systems.

In accordance with the invention, as embodied and broadly described, one aspect of the invention provides a method for processing government sponsored benefits. The method comprises providing a graphical user interface to a benefit recipient for accessing at least account information concerning at least one benefit type. The method further includes receiving a request from the benefit recipient through the graphical user interface for displaying the at least account information concerning the at least one benefit type. The method also includes displaying the at least account information through the graphical user interface concerning the at least one benefit type.

Another aspect of the present invention provides a method for processing government sponsored benefits. The method includes receiving a request from a benefit recipient through a graphical user interface for accessing at least account balance information concerning at least one type of government sponsored benefits. The method further comprises displaying the at least account balance information concerning the at least one type of government sponsored benefits to the benefit recipient through the graphical user interface. Additionally, the method includes receiving an inquiry from the benefit recipient through the graphical user interface concerning the displayed account balance information. The method further includes responding to the inquiry from the benefit recipient concerning the displayed account balance information through the graphical user interface.

Yet another method consistent with the present invention is a method for managing government sponsored benefits. The method includes receiving a request from at least one retailer through a graphical user interface for accessing information regarding transactions handled by the at least one retailer concerning at least one type of government sponsored benefits; and displaying the information regarding the transactions handled by the at least one retailer concerning the at least one type of government sponsored benefits at the graphical user interface.

Still another method consistent with the present invention is a method for managing government sponsored benefits. The method includes providing a web browser based administrative terminal to at least one government representative for managing at least one type of government sponsored benefits. Further, the method includes creating an account for at least one benefit recipient using the web browser based administrative terminal. Also, the method includes issuing a benefit recipient card to the at least one benefit recipient for the at least one type of government sponsored benefits.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

In the drawings:

FIG. 4E is a diagram illustrating an exemplary screen displaying benefit recipient information consistent with methods and systems of the present invention;

FIGS. 5B and 5C are diagrams illustrating an exemplary screen related to replacement of a benefit recipient card consistent with methods and systems of the present invention;

FIG. 5D is a diagram illustrating an exemplary screen related to PIN change for a benefit recipient consistent with methods and systems of the present invention;

FIG. 7A is a diagram illustrating an exemplary screen related to transaction history consistent with methods and systems of the present invention;

FIG. 7C is a diagram illustrating an exemplary screen related to transaction history by a case number consistent with methods and systems of the present invention;

DESCRIPTION OF THE EMBODIMENTS

One embodiment of this invention, known as EPPIC ("Electronic Payment Processing and Information Control"), is presently marketed by ACS State & Local Solutions, Inc. The scope of the present invention, however, encompasses modifications and variations as described by the methods and systems described herein or as contained within the scope of the listed claims and their equivalents.

The disclosed benefits processing system is a distributed architecture based electronic benefits processing system. Accordingly, it may be implemented using object-oriented programming techniques, such as JAVA, distributed databases, and an Internet browser-based front-end. Several users, including federal staff, state staff, county staff, retailers, administrators, and benefit recipients may interact with the benefits processing system without having specialized software on their computers. Benefit recipients may communicate with the system using telephones and/or point of sale terminals, for example, which may be located at retailers.

Figure 1:
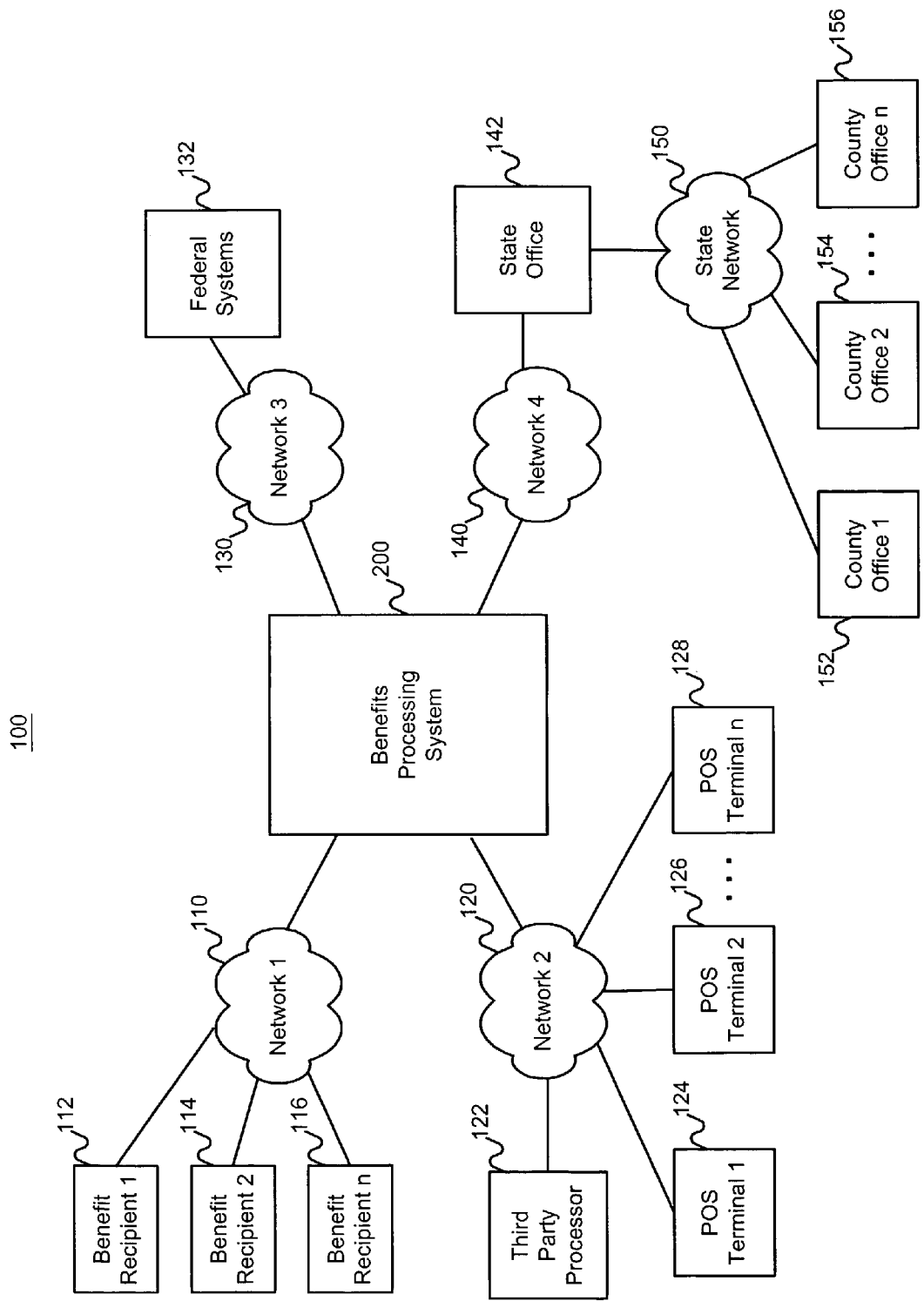
FIG. 1 is an exemplary benefits processing system environment consistent with methods and systems of the present invention.

FIG. 1 illustrates an exemplary benefits processing system environment 10 consistent with methods and systems of the present invention. The exemplary benefits processing system environment includes an Electronic Payment Processing and Information Control ("EPPIC") system, referred to as a benefits processing system 200, connected via a "Network 1" 110 to a "Benefit Recipient 1" 112, a "Benefit Recipient 2" 114, and a "Benefit Recipient n" 116. Although only three benefit recipients are depicted, any number of benefit recipients may be connected to the benefits processing system. Benefits processing system 100 is further connected, via a "Network 2" to a third party processor 122, a "POS Terminal 1" 124, a "POS Terminal 2" 126, and a "POS Terminal n" 128. The benefits processing system is further connected, via a "Network 3" 130 to Federal Systems 132. The benefits processing system may also be connected, via a "Network 4" 140 to a state office 142, which may in turn be connected via state network 150 to a "County Office 1" 152, a "County Office 2" 154, and a "County Office n" 156. Although only a limited number of participants are depicted in FIG. 1, many more participants, such as retailers, third party processors, federal, state, and county offices may be connected to the benefits processing system.

Benefit recipients may access benefits processing system 200 through various access methodologies, depending upon the type of transaction. For example, to purchase groceries using food stamps, a benefit recipient may swipe a benefit recipient card through a point of sale terminal (124 of FIG. 1, for example) located, for example at a retailer, and enter an access code, for example a PIN, to access her food stamp account. An administrator of the benefit recipient program, which may be a state agent or a county agent (located at a state office 142 or at any of the county offices (152, 154, and 156), may then determine eligibility of the benefit recipient for the food stamp program. The eligibility may be used by inputting information concerning the benefit recipient into benefits processing system 200 and using that information to determine whether certain state/federal thresholds are met (for example, whether the benefit recipient's income falls below a certain poverty line). And then, assuming eligibility, debit the amount of purchase from the benefit recipient's account for the amount of purchase. The administrator may then credit the retailer's account. The administrator may also be a third party, for example, a financial institution, whom the state and/or the federal government may have retained for the management of government sponsored benefits, such as food stamps.

Similarly, a benefit recipient may access cash benefits, such as available under the Temporary Assistance for the Needy Families programs using an ATM machine. Accordingly, the benefit recipient may swipe her benefit recipient card at the ATM machine (not shown in FIG. 1) and be connected to the benefits processing system, which then may determine the eligibility and authenticate the identity of the benefit recipient and grant or deny the cash accordingly. As indicated above a third party, such as a financial institution may act as an intermediary and provide access to cash benefits to the benefit recipient.

Each of the "Network 1" 110, "Network 2" 120, "Network 3" 130, "Network 4" 140, and State Network 150 of FIG. 1 may be any mechanism permitting communication among the various components connected by a particular network. Examples of networks that may be used to exchange information among the various components of FIG. 1 include networks such as the Internet, telephony networks, private networks, virtual private networks, local area networks, metropolitan area networks, wide area networks, ad hoc networks, state networks, frame-relay networks, or any other mechanism for permitting communication between remote sites, regardless of whether the connection is wired or wireless. Thus, the present invention can be used in any environment where information may be exchanged by any means among the various components, including, for example the benefits processing system 200, the third party processor 122, and the federal system/state offices 132/142.

Using any of the POS terminals (for example, 124, 126, and 128 of FIG. 1), a benefit recipient may access food stamp benefits, for example, as part of a purchase at a retailer.

Federal Systems 132 may include any federal agency involved in the grant, management, or distribution of benefits. Thus, federal systems 132 may include the Federal Reserve Bank, the US Department of Agriculture, and/or any other federal agency that may be a stakeholder or participant in a benefits program.

State Office 142 may include any state office with a stake in the benefits program. Using a web-based interface, staff at state office 142 may administer the benefits program and/or generate reports.

County office A 152, County office B 154, and County office Z 156 may provide county staff with access to the benefits processing system. Although FIG. 1 shows county offices connected to State Office 142 via State Network 150, which is then connected via "Network 4" 140 to benefits processing system 200, county offices 152-156 may be connected directly via another network to the benefits processing system.

Figure 2:
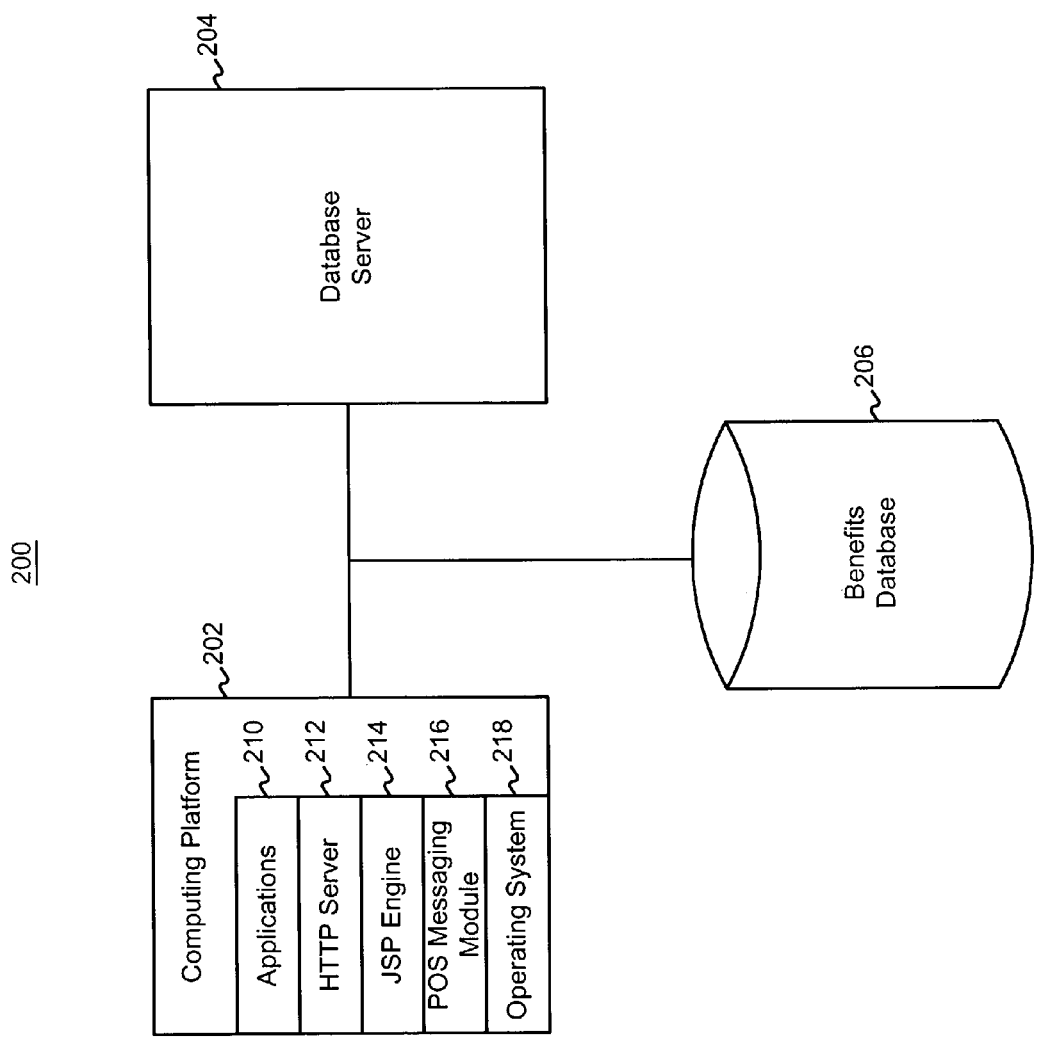
FIG. 2 is a diagram illustrating a benefits processing system consistent with methods and systems of the present invention.

FIG. 2 is a diagram illustrating a benefits processing system 200, consistent with methods and systems of the present invention. As shown the benefits processing system may include a computing platform 202, a database server 204, and a benefits database 206. Computing platform 202 may further comprise applications 210, HTTP server 212, JSP engine 214 (described below), POS messaging module 216, and Operating system 218. Although not shown, at least one processor (such as Intel Pentium processor) may execute the various applications to provide functionality associated with the benefits processing system. Additionally, HTTP server 212 may provide automatic file processing ability using, for example, an Extended Markup Language ("XML") processor that may automatically process files received from a government entity. In one embodiment, for example, the received file may comply with an XML schema and relying upon that schema an XML processor may extract records located in the file.

The file may be at least one of a benefit recipient account setup file, a benefit recipient account update file, and a benefit recipient update file. By processing any of these files account setup, account update, and benefits update may be handled. Automatic processing of the file may further include acknowledging a receipt of the file, validating a format of the file; and processing the records located in the file. Thus, for example, processing of the file may include extracting the relevant information from the file and updating databases related to benefits information, such as benefits database 206.

HTTP server 212 may be any HyperText Transport Protocol compatible server, such as Apache Web Server, Microsoft IIS, or Netscape Enterprise Server. Although FIG. 2 depicts a HTTP-based system, one may use any equivalent system that enables remote devices to access functionality located on the benefits processing system.

JSP Engine 214 may include Java Server Pages-related technology (a technology from Sun Microsystems) permitting delivery of dynamic content to the users of benefits processing system 200. In one embodiment, Java language from Sun Microsystems may be used for scripting applications 210. JSP Engine 214 may further have access to Sun Microsystem's J2EE platform for accessing the relevant software libraries/modules. Other similar technologies, such as Active Server Pages (from Microsoft) may also be used. Additionally, CGI scripts or similar technologies that do not necessarily separate page design from programming logic may also be used.

POS messaging module 216 may provide messaging functionality such as ISO 8583 messaging between the POS terminals (not shown in FIG. 2) and benefits processing system 200. Such messaging may be accomplished over X.25 and IP protocols or other appropriate protocols.

Operating system 218 may provide an interface between the various software modules of computing platform 202 and hardware associated with the computing platform. Operating system 218 may be implemented using Sun Microsystem's Solaris operating system. It may also be implemented using other appropriate operating systems such as UNIX, Linux, Microsoft NT, HP-UX, AIX, or any other operating system that may interface the software modules with the hardware associated with computing platform 202.

Database server 204 may be any database server program, such as Oracle 9i from Oracle that may be used to provide access to benefits database 206.

Benefits database 206 may be a single database or distributed over multiple databases. Although FIG. 2 shows only one database, benefits processing system 200 may either include or connect to other databases as well. Such databases may include, for example, census data or other relevant data.

Figure 3:
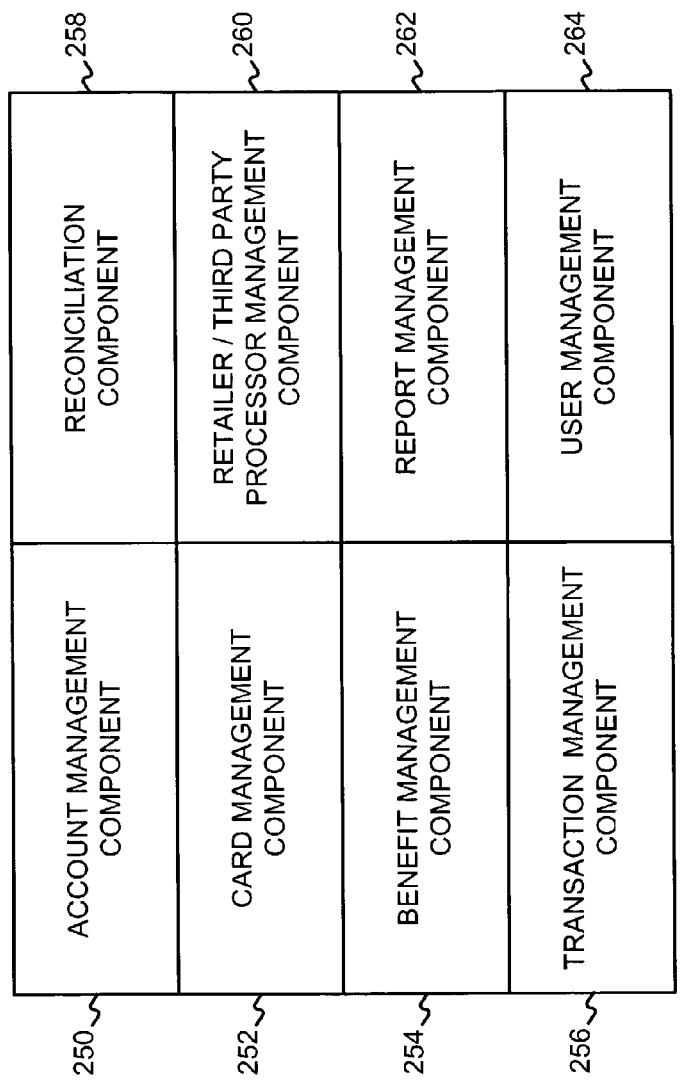
FIG. 3 is a diagram illustrating various modules of the benefits processing system consistent with methods and systems of the present invention.

Referring now to FIG. 3, applications 210 may include software components providing account management component 250, card management component 252, benefit management component 254, transaction management component 256, reconciliation component 258, retailer/third party processor management component 260, report management component 262, and user management component 264. Of course, the functionality provided in these modules may be combined or distributed further into sub-modules. Additionally, more functionality may be added using additional software modules.

Figure 4A:
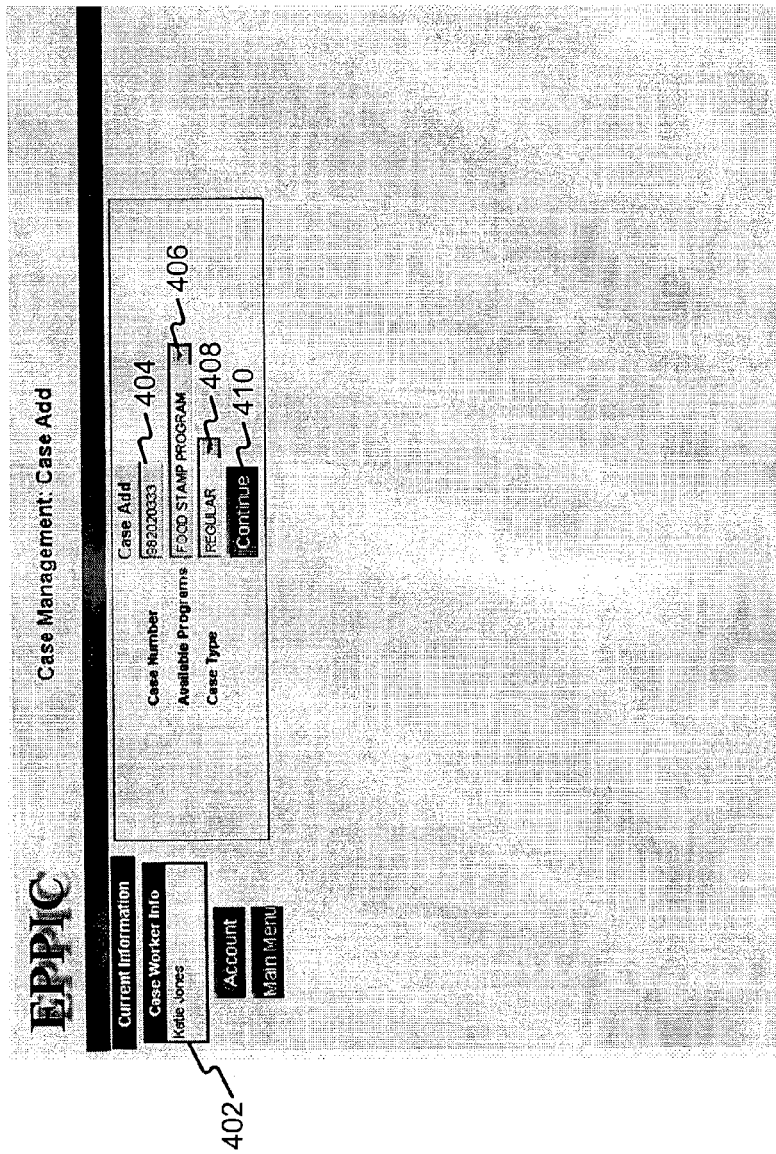
FIG. 4A is a diagram illustrating an exemplary screen related to account setup consistent with methods and systems of the present invention.
Figure 4B:
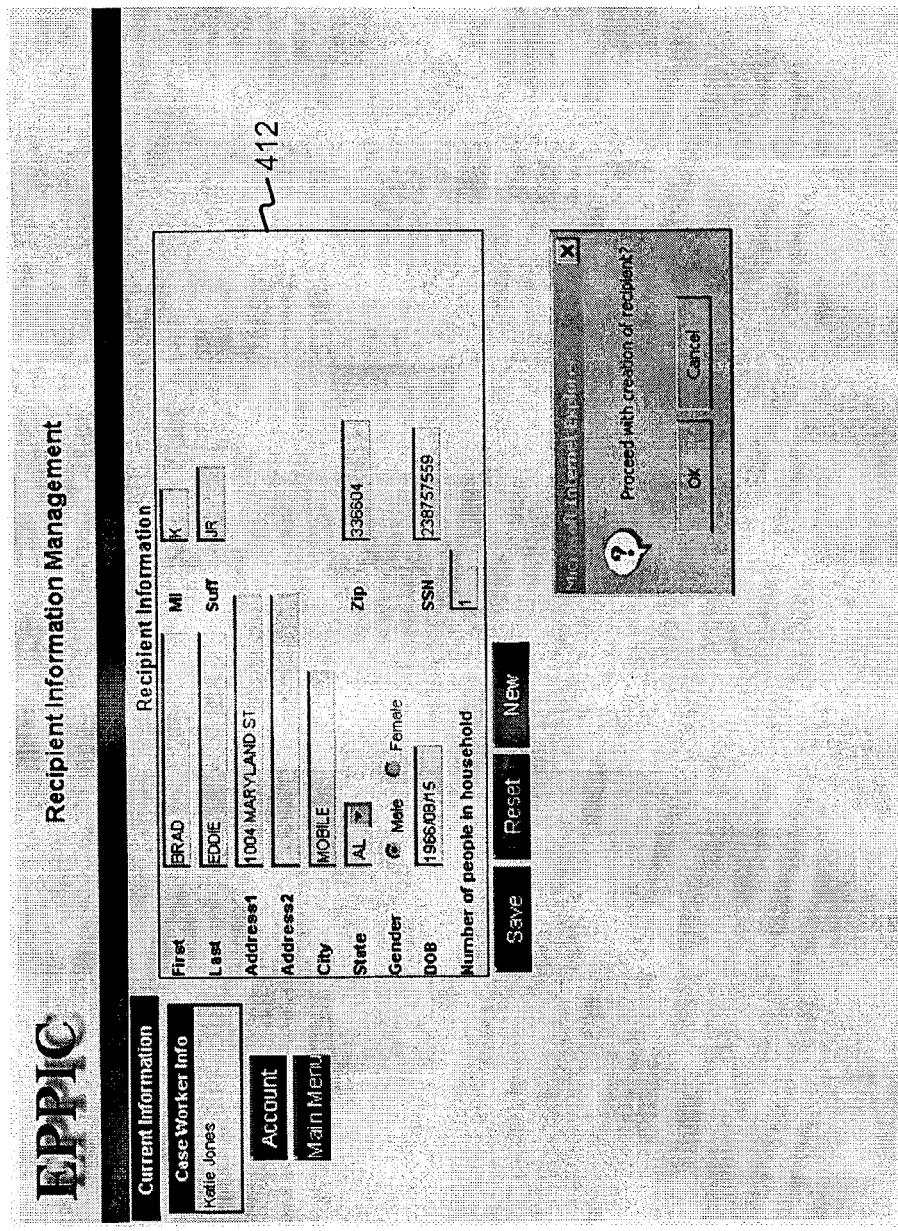
FIG. 4B is a diagram illustrating an exemplary screen related to benefit recipient information management consistent with methods and systems of the present invention.
Figure 4C:
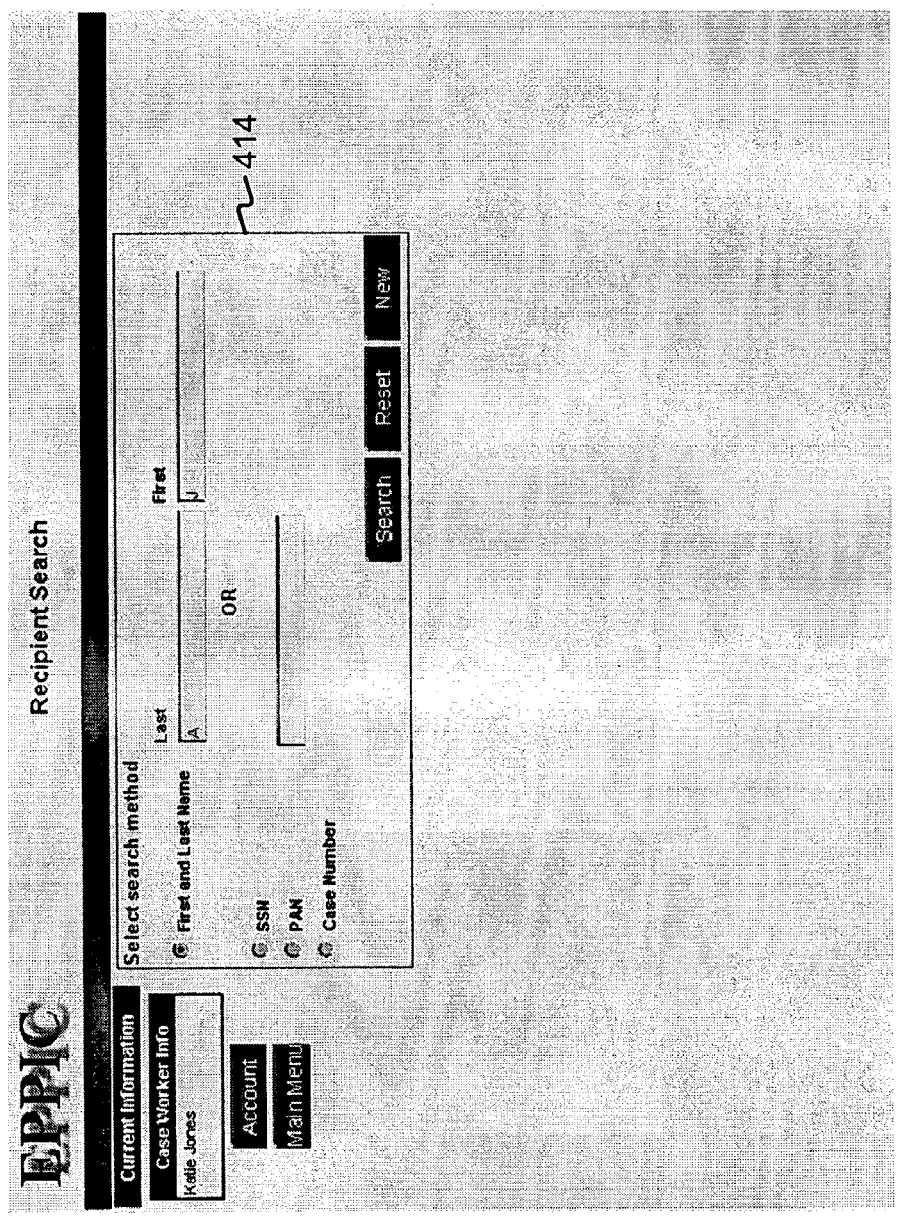
FIG. 4C is a diagram illustrating an exemplary screen related to benefit recipient search consistent with methods and systems of the present invention.
Figure 4D:
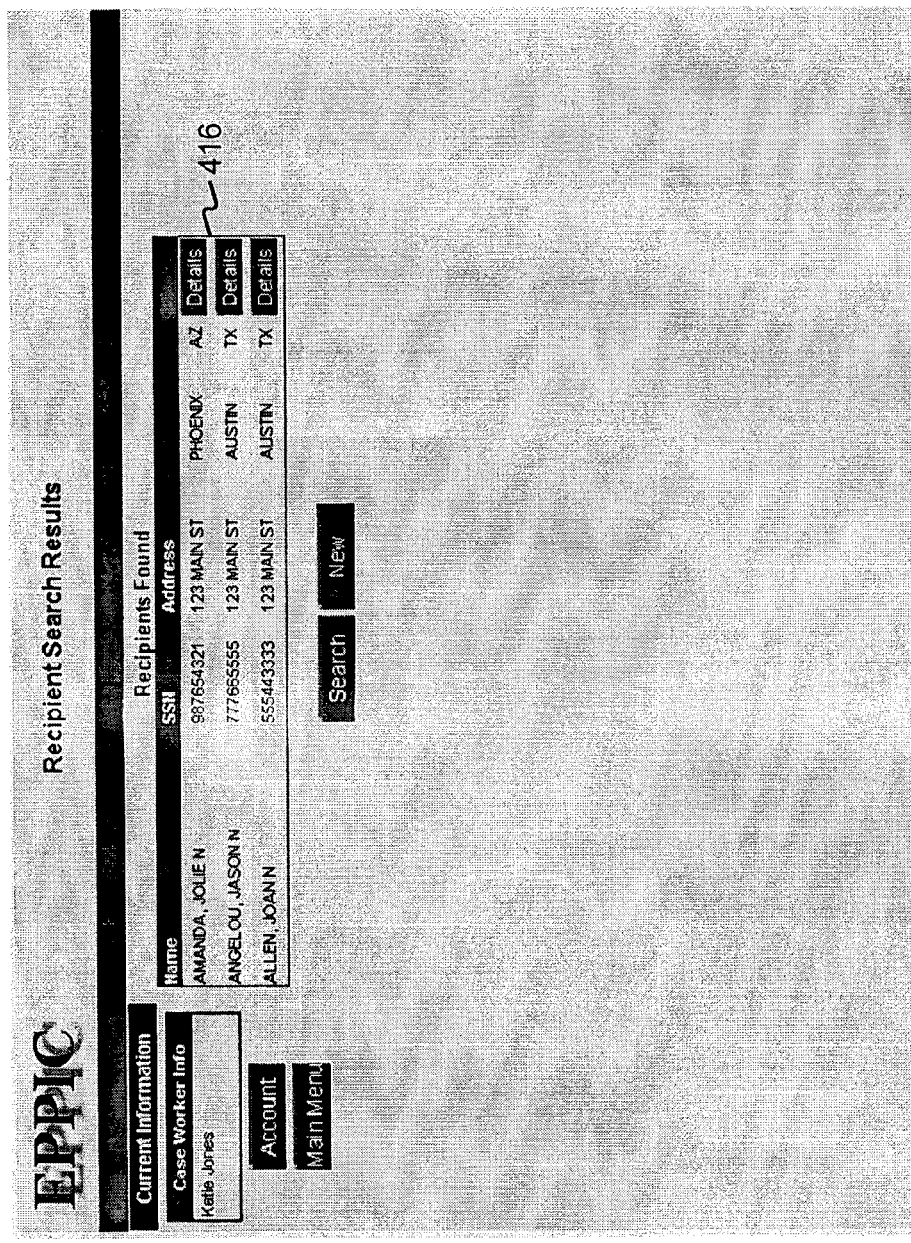
FIG. 4D is a diagram illustrating an exemplary screen displaying benefit recipient search results consistent with methods and systems of the present invention.
Figure 4E:
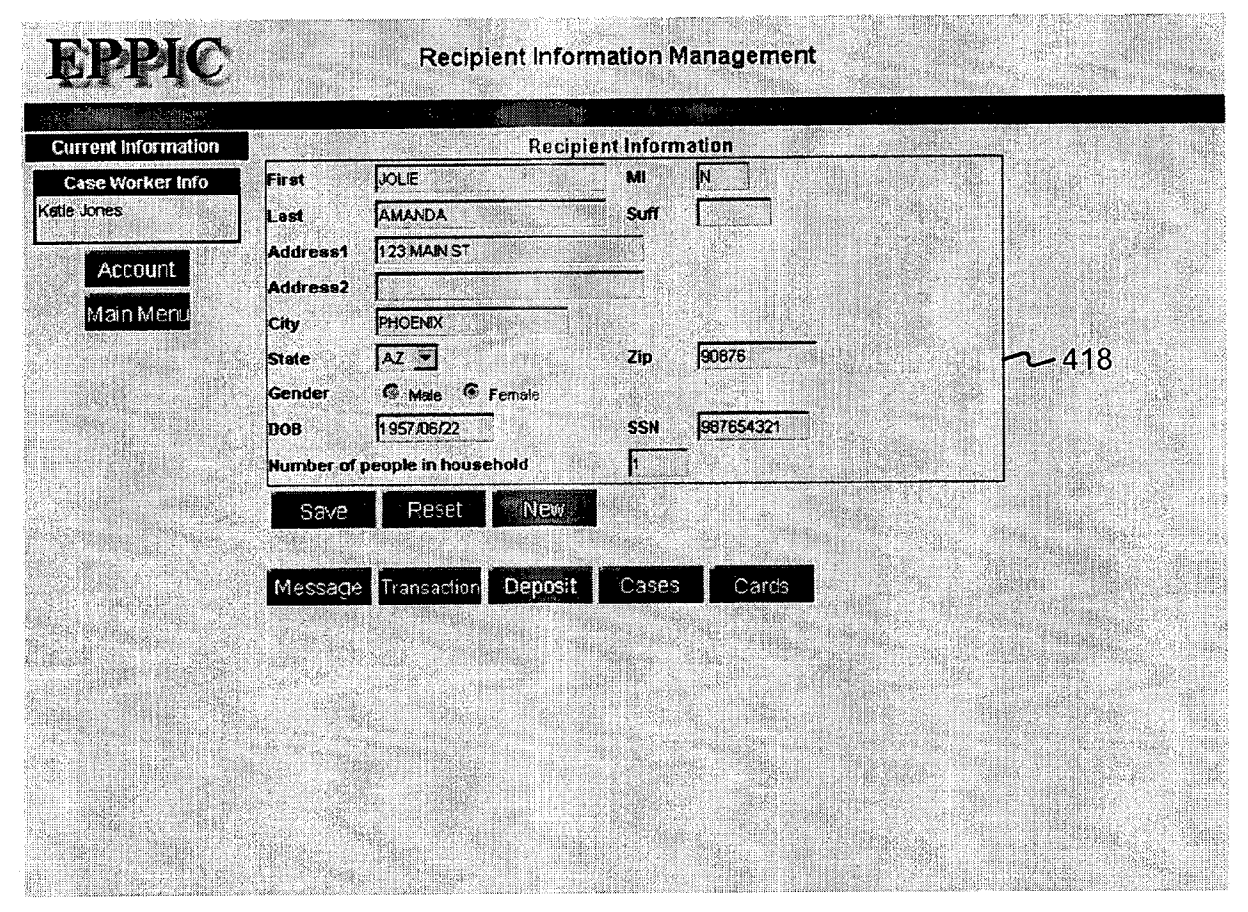

FIG. 4A shows an exemplary screen related to account setup related to account management component (FIG. 3, 250), for example. Account management component 250 may provide account creation for a benefit recipient or an authorized representative of the benefit recipient. Thus, for example, as shown in FIG. 4A, an authorized user of benefits processing system 200 may add a new case to an available program, such as the food stamp program. Accordingly a case worker 402 may add a case with a certain case number 404, assign it to one of the available programs 406, designate a case type 408 and continue 410 with processing. Further, as shown in FIG. 4B, the authorized user may provide relevant information 412 concerning the new account, which then may be stored, for example, in the benefits database of FIG. 2. Also, as depicted in FIG. 4C, as part of account management component 250, one may search for benefit recipients using their first or last names, their social security numbers, case numbers, or any other identification associated with the benefit recipients (search window 414). FIG. 4D depicts the results 416 of such a search. Further, FIG. 4E is an exemplary diagram illustrating at least a portion of information 418 relevant to a benefit recipient. This information may include, for example, the recipient's name, address, gender, date of birth, number of people in the household, and social security number.

Figure 5A:
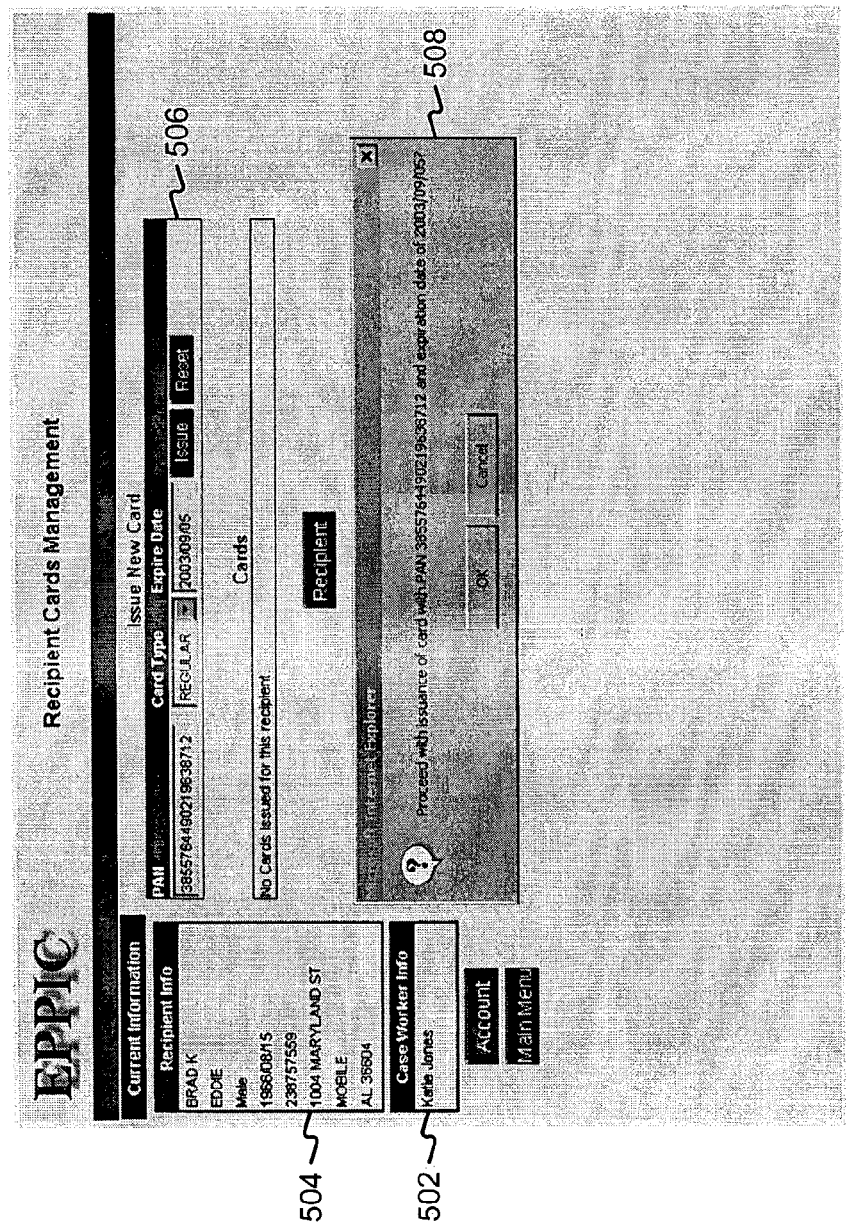
FIG. 5A is a diagram illustrating an exemplary screen related to issuance of a new benefit recipient card consistent with methods and systems of the present invention.
Figure 5B:
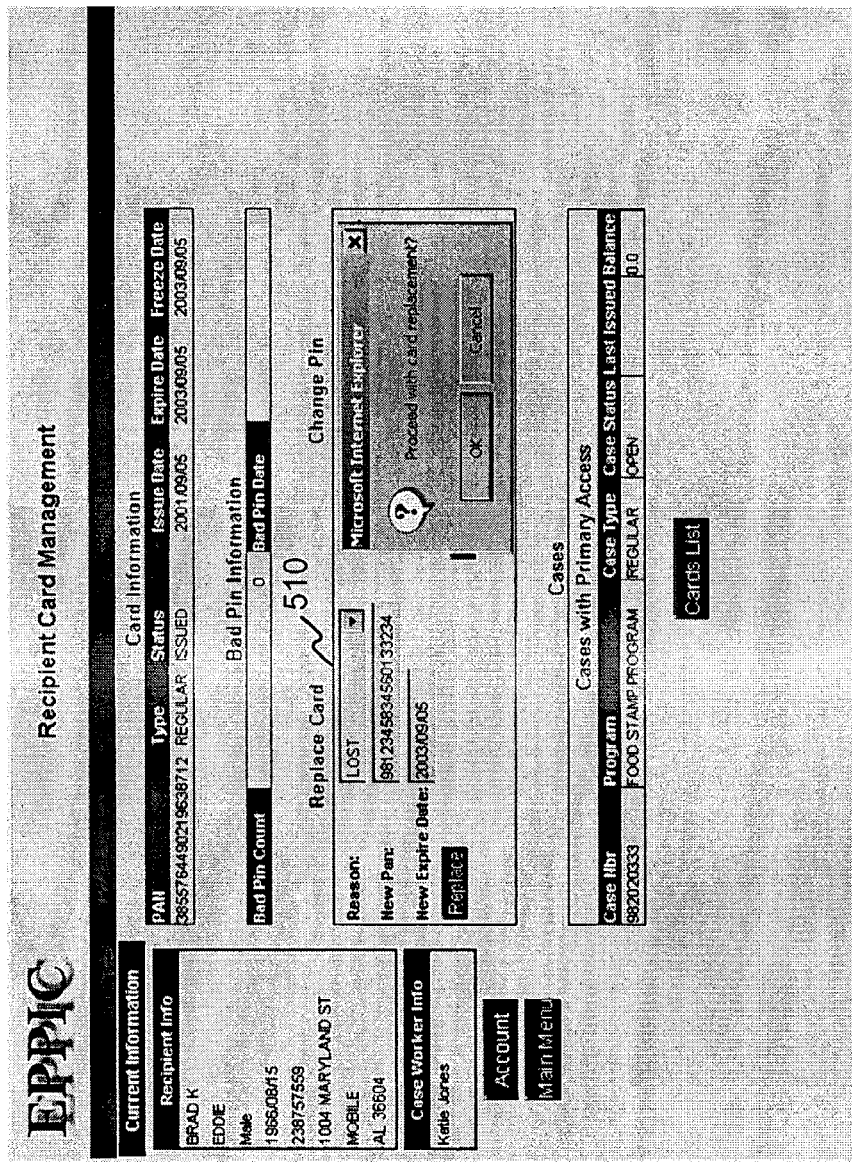
Figure 5C:
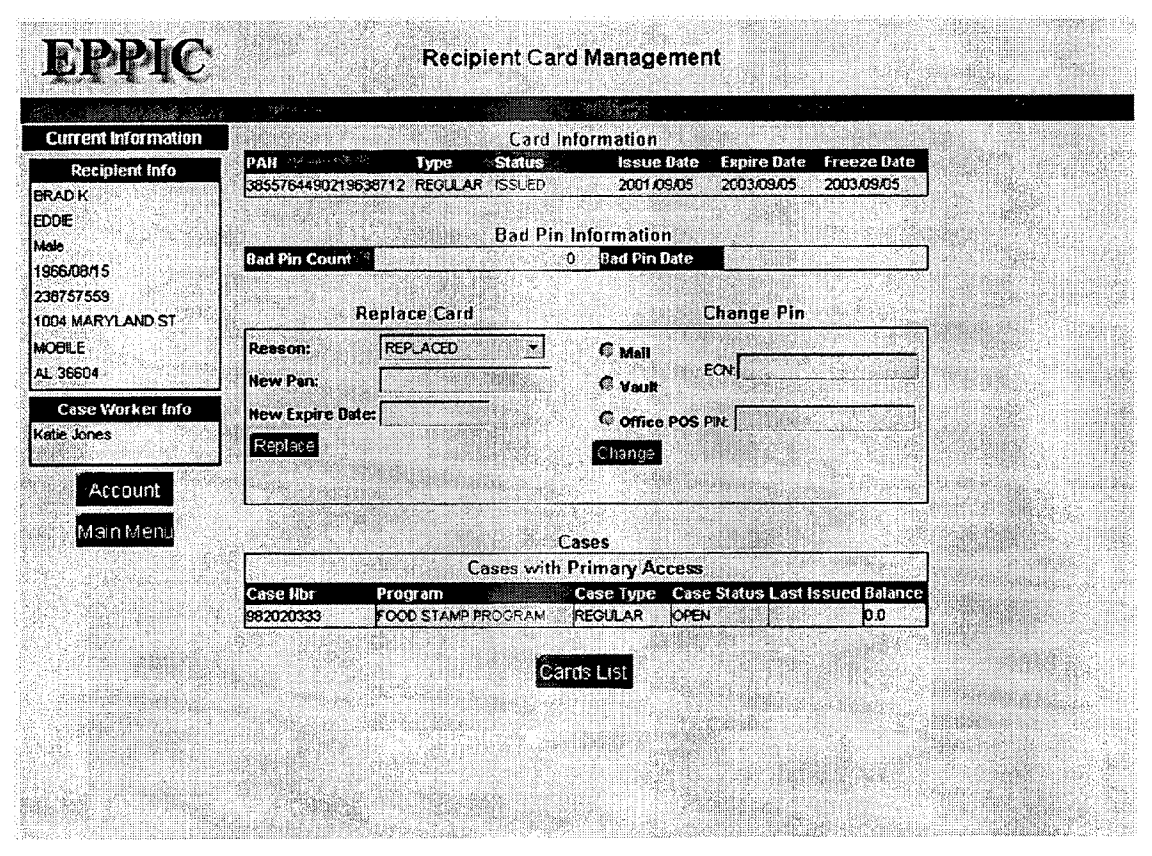

Referring back to FIG. 3, card management component 252 may provide functionality associated with managing benefit recipient cards. Such cards may be plastic cards with magnetized strips of information, smart cards, or any other card that may be used for retrieval and storage of benefits information. Card management component 252 may include, among other things, issuing new cards, activating the newly issued cards, replacing existing cards (for example damaged or lost cards), changing a card's status, displaying the history of a card (for example, showing all current and prior card numbers with replacement date and status), assigning an authorized representative and/or protective payee to a food stamp or a cash account, issuing a PIN associated with a particular card, and allowing benefit recipients to change PIN's, for example, using a POS terminal or an ATM. As shown in FIG. 5A, card management component 252 may include issuance of a new card 506. Accordingly, a case worker 502 may issue a card to a benefit recipient (recipient information 504). Once selected for issuance the benefits processing system may require confirmation 508 before issuing the card. Additionally, as depicted in FIGS. 5B and 5C, card management may further include replacement 510 of a lost or damaged card. Also, as shown, in FIG. 5D, using card management one may associate a code with a particular card, for example a PIN associated with a card.

Figure 6A:
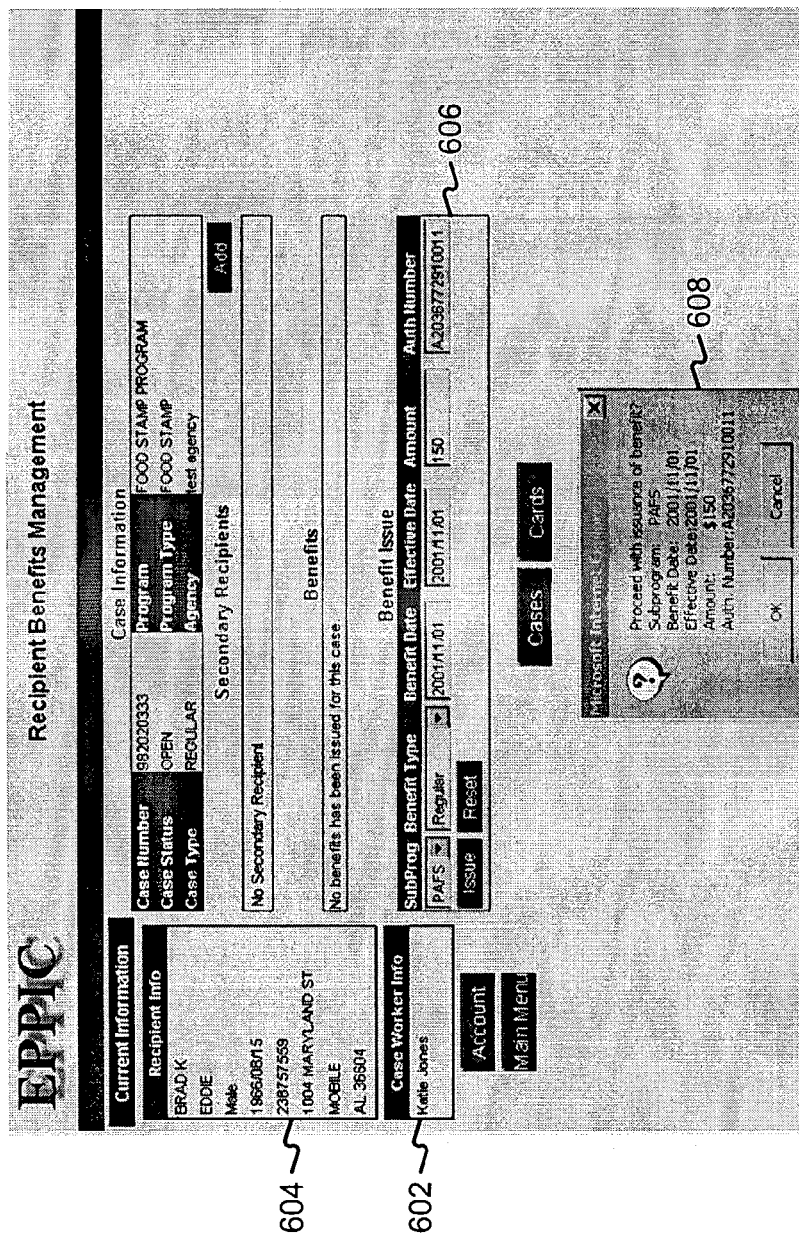
FIG. 6A is a diagram illustrating an exemplary screen related to issuance of a benefit to a benefit recipient consistent with methods and systems of the present invention.
Figure 6B:
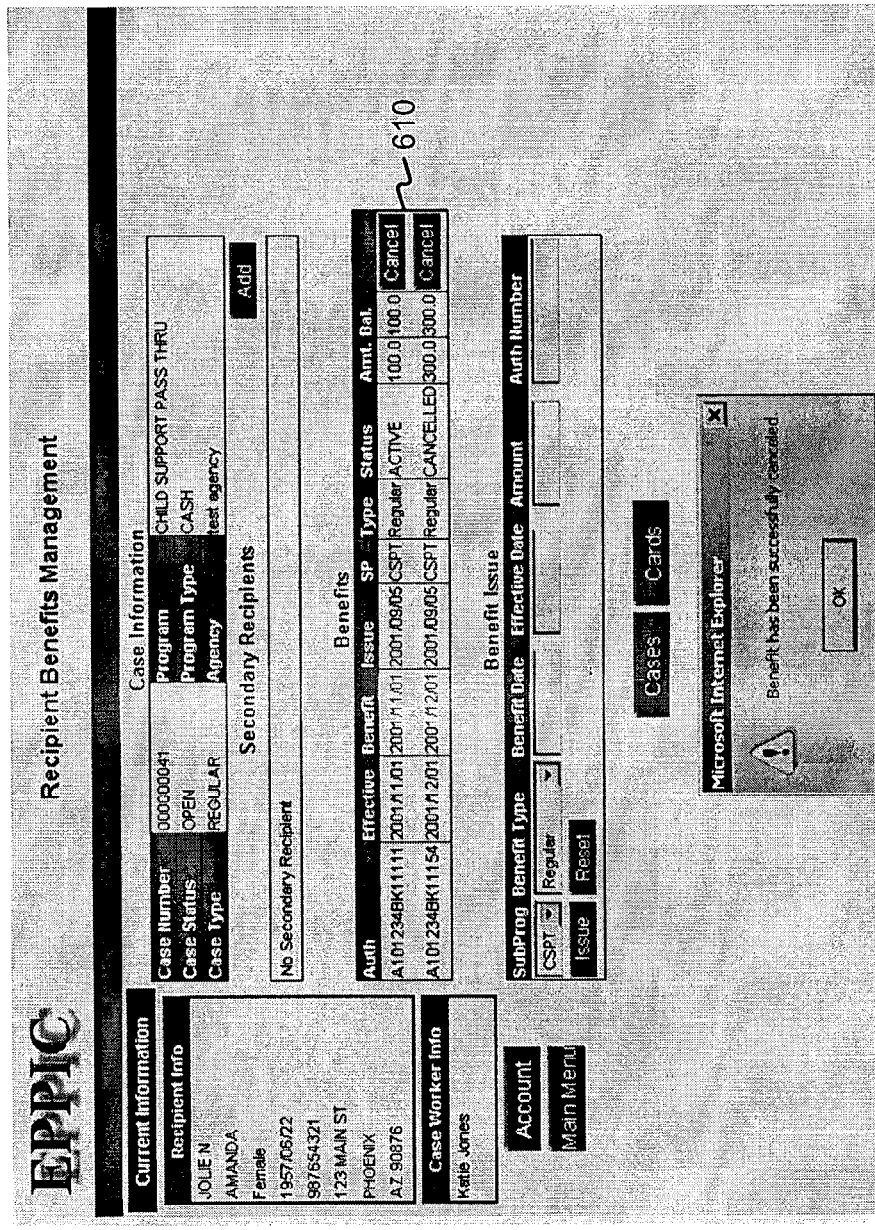
FIG. 6B is a diagram illustrating an exemplary screen related to cancellation of a benefit consistent with methods and systems of the present invention.
Figure 6C:
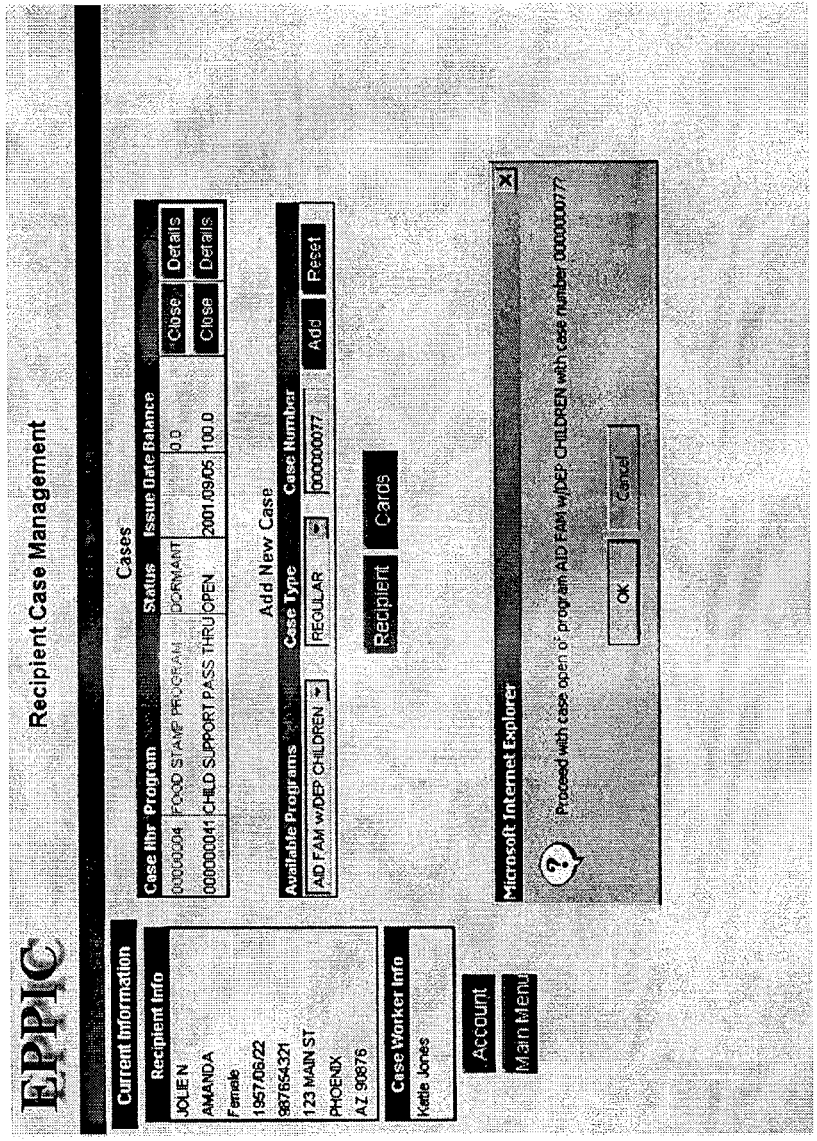
FIG. 6C is a diagram illustrating an exemplary screen related to addition of a benefit program for a benefit recipient consistent with methods and systems of the present invention.

Referring again to FIG. 3, benefit management component 254 may provide functionality associated with managing benefits for various benefit recipients. Benefit management component 254 may include, among other things, issuing new benefits, canceling existing benefits, and benefit conversion. Benefits include, but are not limited to, food stamp benefits, cash benefits, and/or any other government sponsored benefits. As shown in FIG. 6A, a user, such as a benefits administrator, may specify a particular benefits program, amount of the benefit, and any other relevant information and issue the benefit to a benefit recipient. Accordingly, as shown in FIG. 6A, case worker information 602 and recipient information 604 may be displayed. Also, benefit type, benefit amount, and its effective date may be specified (606). Issuance of benefits may be confirmed (608). Similarly, the benefits administrator may cancel benefits, as shown in FIG. 6B. Existing benefits may be listed (610). Also, the benefits administrator may add benefits programs, as shown in FIG. 6C. As part of the process, the benefits processing system may display a list of available programs to the benefit recipient, based on, for example, the recipient's eligibility for such programs and the programs that the benefit recipient is already assigned to. Benefit management may further include conversion of one form of benefits to either cash or coupons. For example, food stamp benefits may be converted into cash, if approved.

Figure 7A:
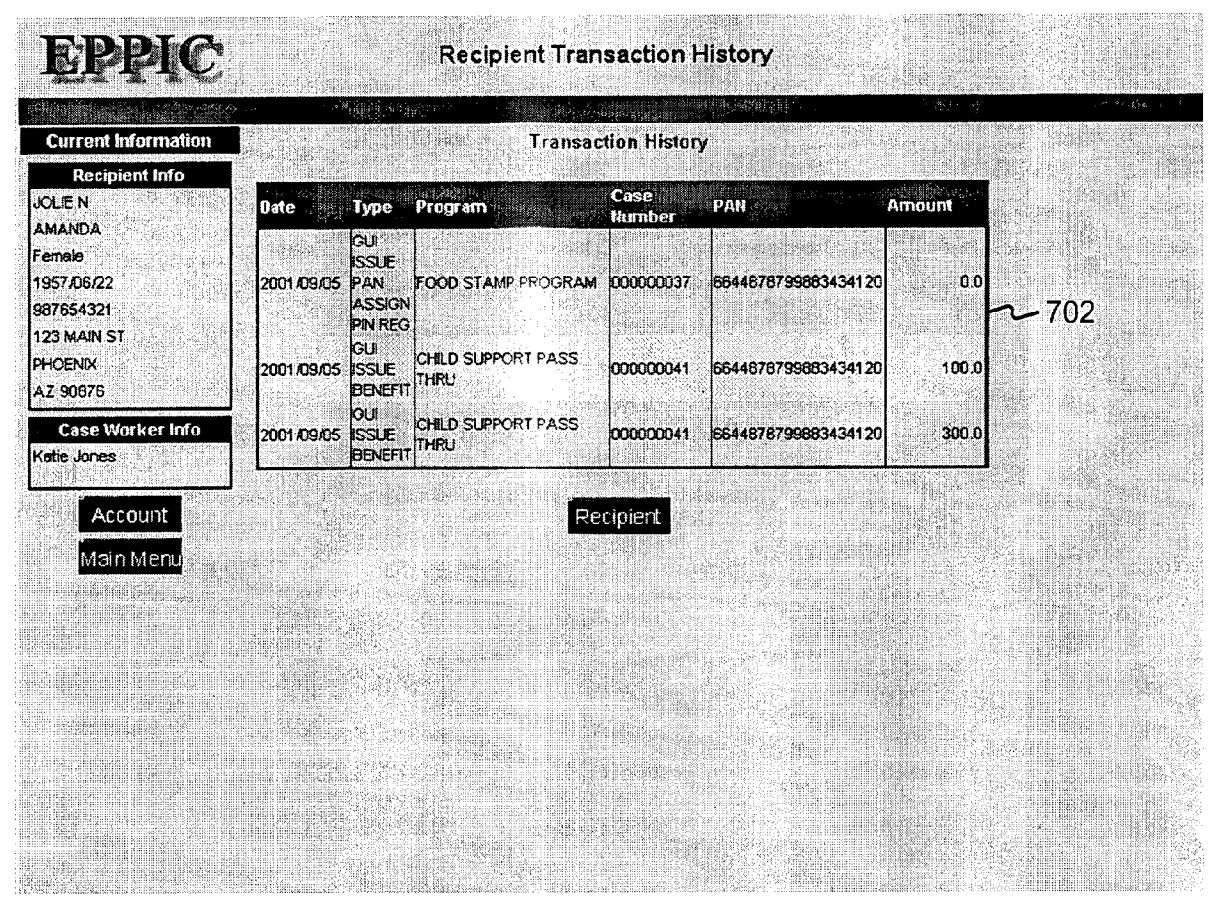
Figure 7B:
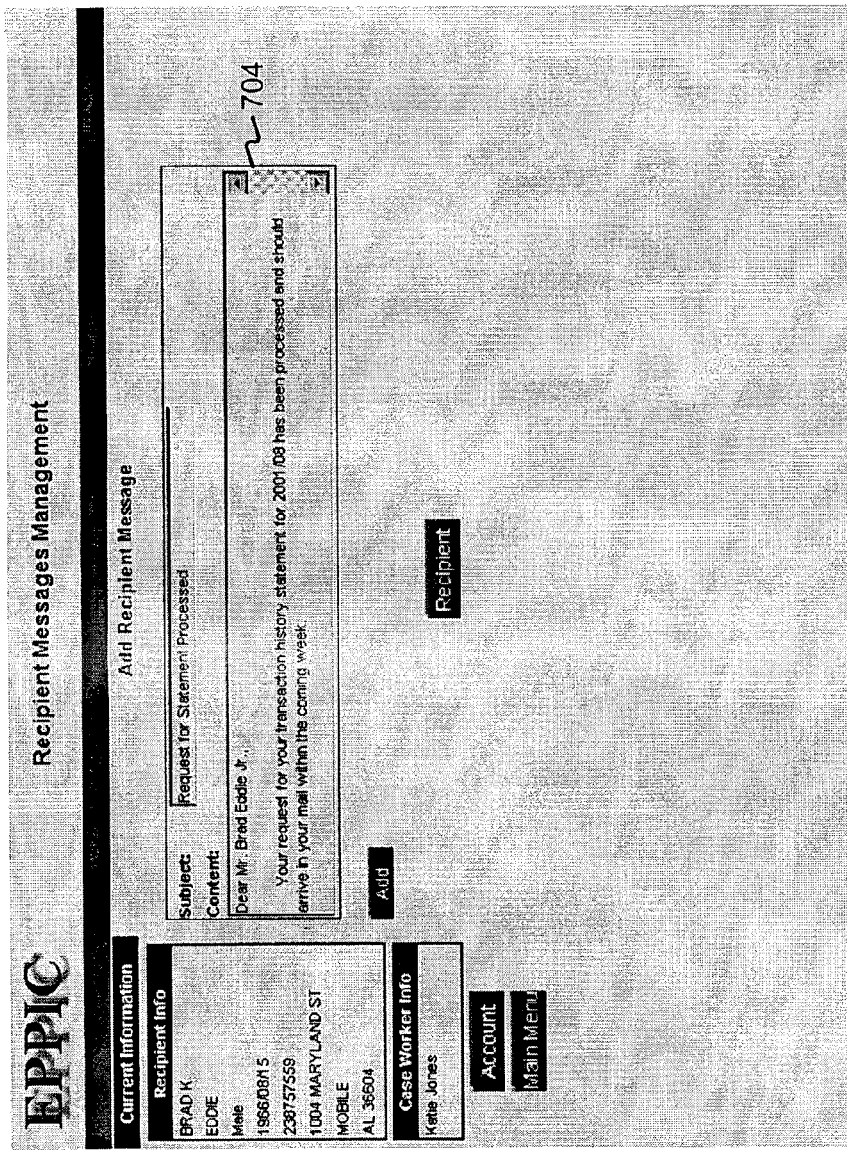
FIG. 7B is a diagram illustrating an exemplary screen related to messaging for benefit recipients consistent with methods and systems of the present invention.
Figure 7C:
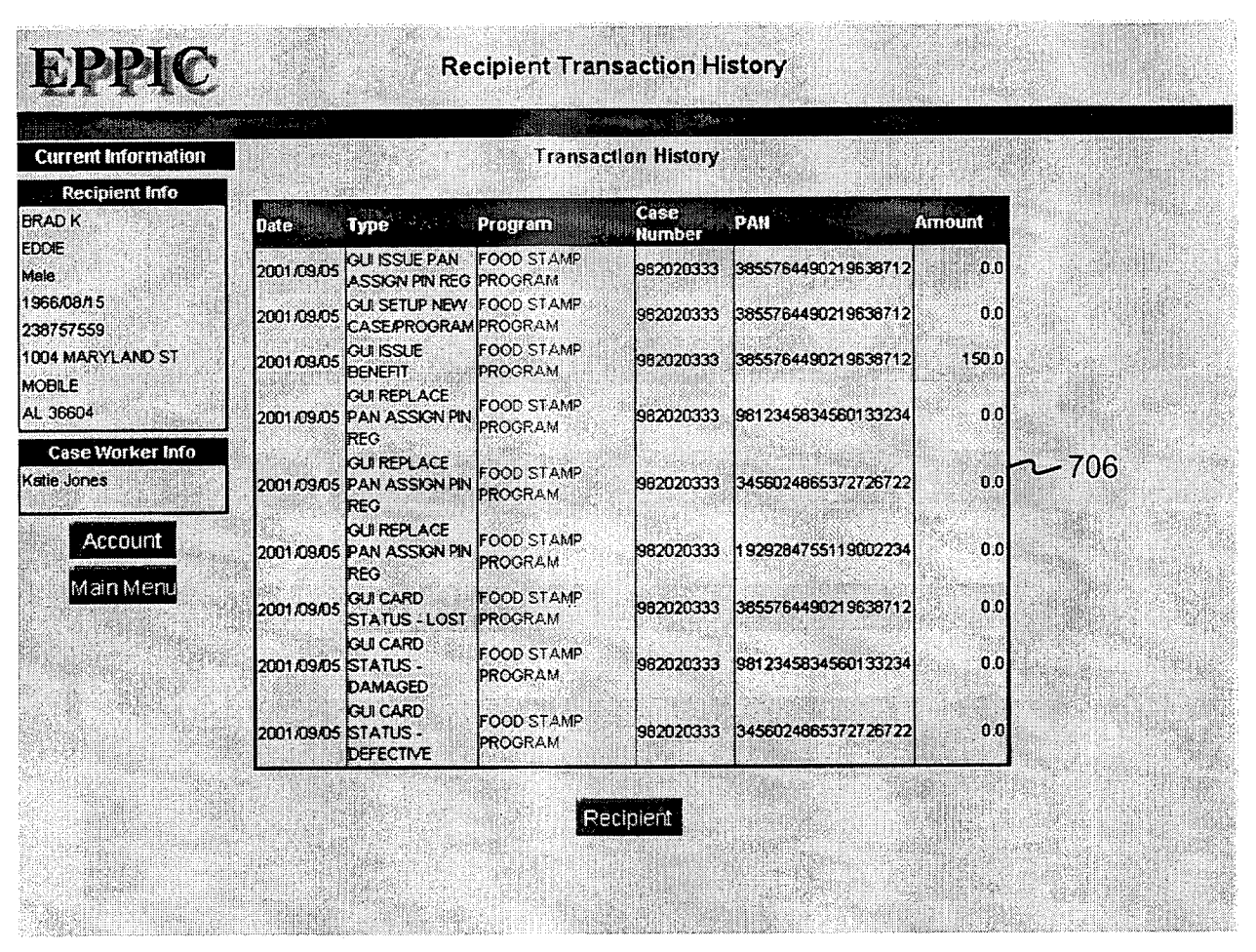

With reference to FIG. 3, transaction management component 256 may provide functionality associated with tracking transactions related to a particular benefit recipient, a particular benefit, or a particular benefit program. Transaction management component 256 relates to both client transactions and retail transactions. Client transaction management may include displaying summary information on every client debit/credit transaction and displaying specific detailed information for each debit/credit transaction for a client. Retail transactions may include displaying summary information on every transaction for the retailer by the date selected and displaying specifics on any particular transaction. Thus, for example, as shown in FIG. 7A, an administrator may investigate transaction history 710 of a particular benefit recipient. Additionally, as shown in FIG. 7B, the administrator may also send a message 704 confirming transmittal of transaction history to a benefit recipient. Further, as shown in FIG. 7C, the administrator may display detailed transaction history 706 for a particular benefit recipient.

Referring now to FIG. 3, reconciliation management 258 may include functionality allowing a client to pay back a previous overpayment, adjust balances for a client or a retailer, and provide reconciliation data related to clients, retailers, and third party processors.

Retailer/third party processor management component 260 may provide retailer search and retailer set up functions. Thus, for example, using retailer/third party processor management component 260 an administrator may search for a retailer by retailer name or an identification number associated with the retailer. Also, the administrator or another authorized user may add new retailers to the system, modify retailer information, and/or add new third party processors to the system.

Figure 8:
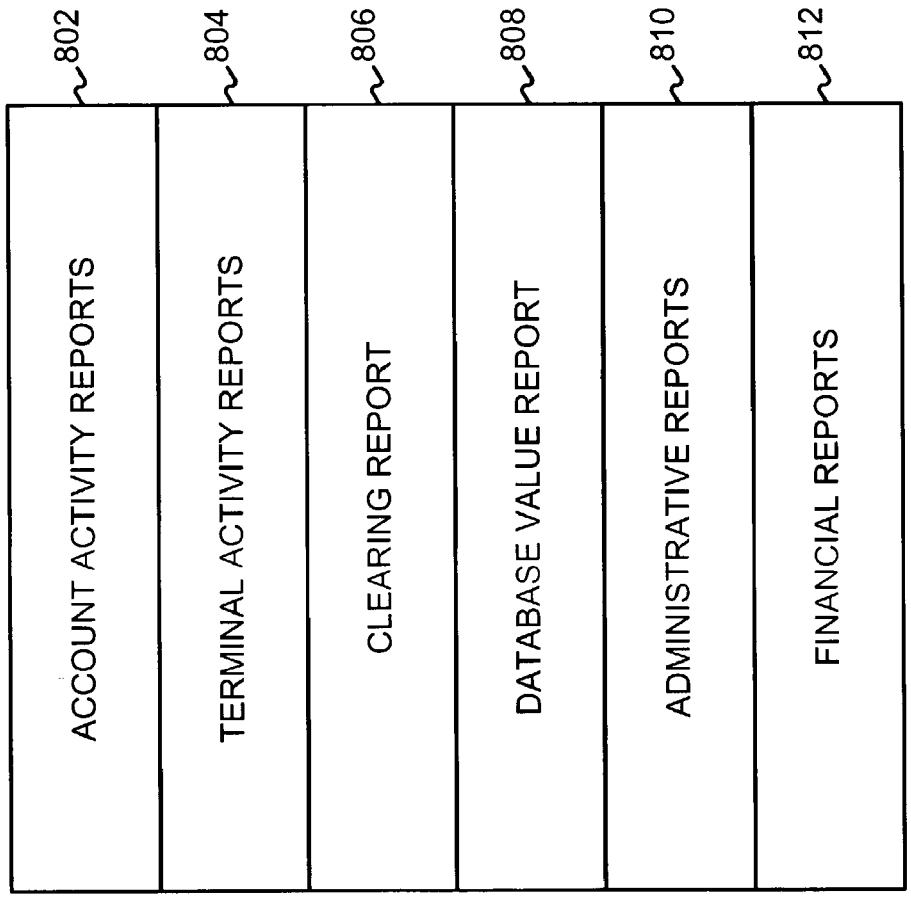
FIG. 8 is a schematic diagram illustrating exemplary reports that may be generated consistent with methods and systems of the present invention.

Report management component 262 may provide functionality related to generating reports, viewing reports, and printing reports. It may also permit retrieval of archived data. As shown in FIG. 8, various reports may include account activity reports 802, terminal activity reports 804, clearing report 806, database value report 808, administrative reports 810, and/or financial reports 812. An account activity report 802 may reflect all transactions related to an account for a particular day. It may also provide information concerning all account related transactions done on behalf of a state or an agent of the state. Details may be provided related to any transaction that impacts an account balance. A transaction originator may be identified by both a processor identification number and a batch file name associated with the transaction. Terminal activity reports 804 may indicate all transactions that result in fund movement, for example, to a retailer, third party processor, or an ATM network. Such a report may list the transaction type, the amount of transaction, the transaction date, the settlement date, a merchant and terminal identifier, and the benefits impacted by each transaction. Terminal activity reports 804 may further include settlement totals for third party processors, retailers, and any other entity for which funds will be moved. Suspense totals, totals that wont be settled until the next processing day, may be reported by individual benefit types.

Clearing report 806 may provide information concerning total funds that are being settled Administrative reports 810 includes any other reports related to the administration of benefits. Financial reports 812 may relate to the various financial data concerning the benefits, which may be arranged in any manner.

Referring again to FIG. 3, user management component 264 may include functionality related to managing user accounts, for example, adding, modifying, and deleting user accounts. It may also include functionality related to adding, modifying, and deleting login privileges for various users of the benefits processing system of FIG. 2.

Figure 9:
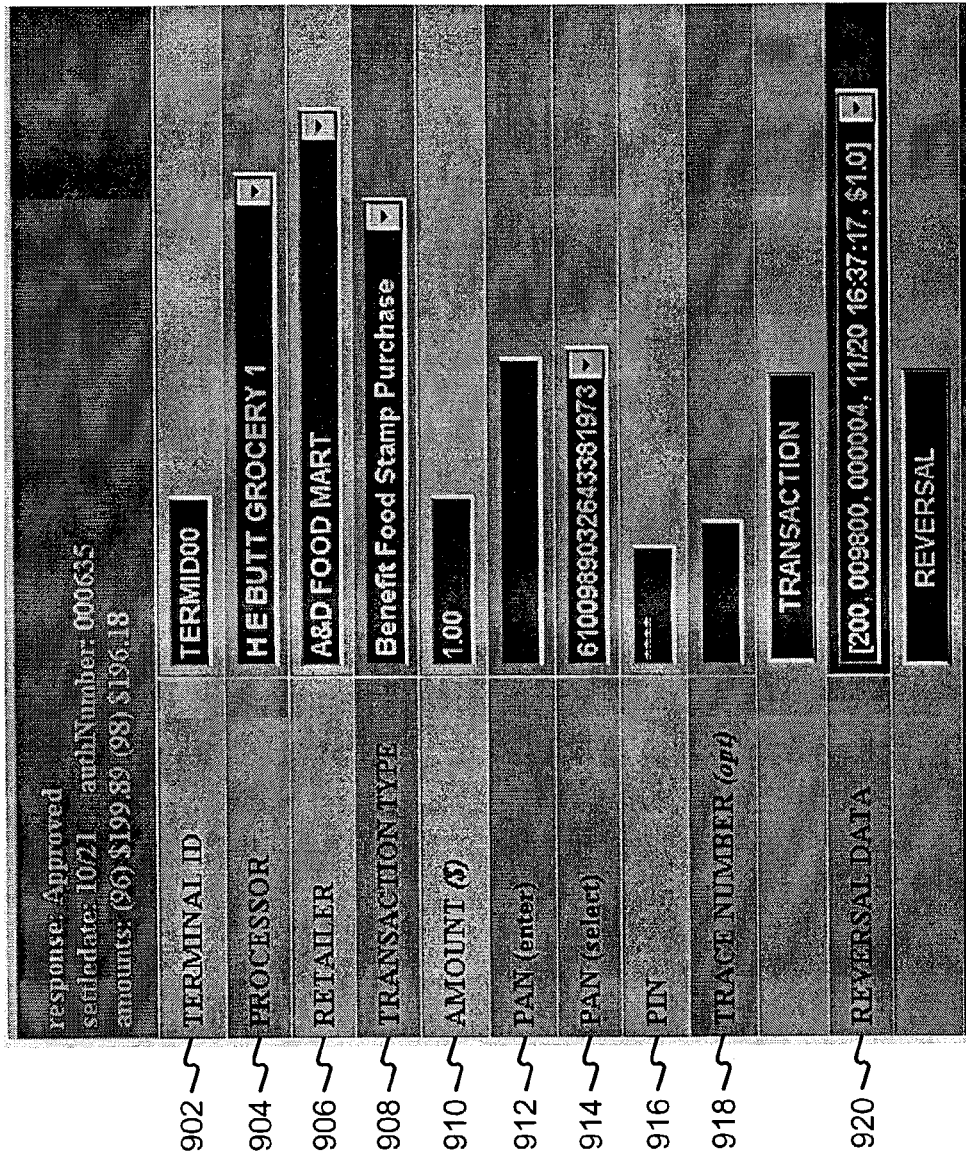
FIG. 9 is an exemplary display at a point of sale terminal consistent with methods and systems of the present invention.

Referring now to FIG. 9, it shows an exemplary user interface for a point of sale terminal. The exemplary user interface may include POS terminal identification number 902, the name of the third party processor handling transactions 904, the name of the retailer 906, transaction type 908 (for example, Food Stamp purchase), amount of transaction 910, a space to enter the benefit recipient's primary access number (PAN), which may be referred as the card number, a pull down list to select a PAN corresponding to the benefit recipient 914, an optional trace number 918, and reversal data 920, which may be used to reverse a transaction later.

Figure 10:
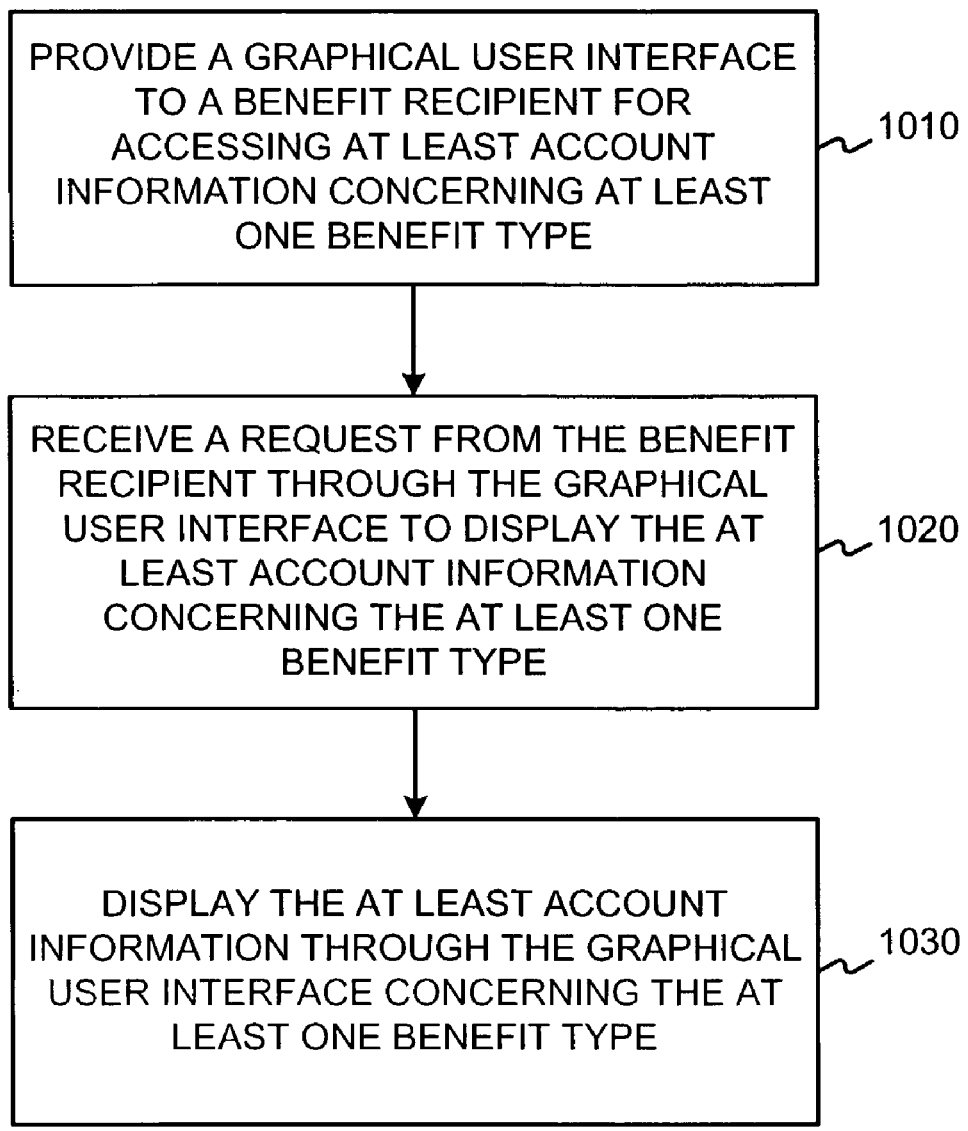
FIG. 10 is a flow diagram illustrating an exemplary method for processing government sponsored benefits consistent with methods and systems of the present invention.

Referring now to FIG. 10, a flow chart is shown corresponding to an exemplary method for processing government sponsored benefits. As shown, the method may comprise providing a graphical user interface to a benefit recipient for accessing at least account information concerning at least one benefit type (step 1010). The graphical user interface (as referred to with respect to this method and other methods consistent with the present invention) may be implemented using a web browser, for example, Microsoft Internet Explorer, Netscape Navigator, or any other similar software. The graphical user interface may be made available on a personal computer, a handheld computer, a television, a thin computer, or any other device capable of accessing a network, such as the Internet, via a graphical user interface. Interactive functionality may be provided using XML, Java Server Pages, Microsoft Active Server Pages or any other similar combination of software. For example, FIG. 2 depicts a HTTP server 212 and JSP engine 214, which may be used to act as an intermediary between benefits database 206 (of FIG. 2) and the benefit recipient. Using the graphical user interface, the benefit recipient may access at least account information concerning at least one benefit type. The term "account information" as used herein includes, but is not limited to, account balance information, and any other information related to the benefit recipient. Further, benefit type includes at least food stamp benefits and cash benefits.

Next, a request from the benefit recipient through the graphical user interface may be received for displaying the at least account information concerning the at least one benefit type (step 1020). The benefit recipient may request information concerning the at least one benefit type using any user interface element, such as selecting an item from a pull-down list, clicking a button, or any other type of graphical user interface element.

As shown in FIG. 10, the at least account information concerning the at least one benefit type may then be displayed through the graphical user interface (step 1030). Consistent with this method, such information may be displayed immediately after receiving the request or may be displayed at a later time.

Further, the benefits processing system may also display at least one electronic message concerning the at least one benefit type to the benefit recipient (for example, as shown in FIG. 7B).

Figure 11:
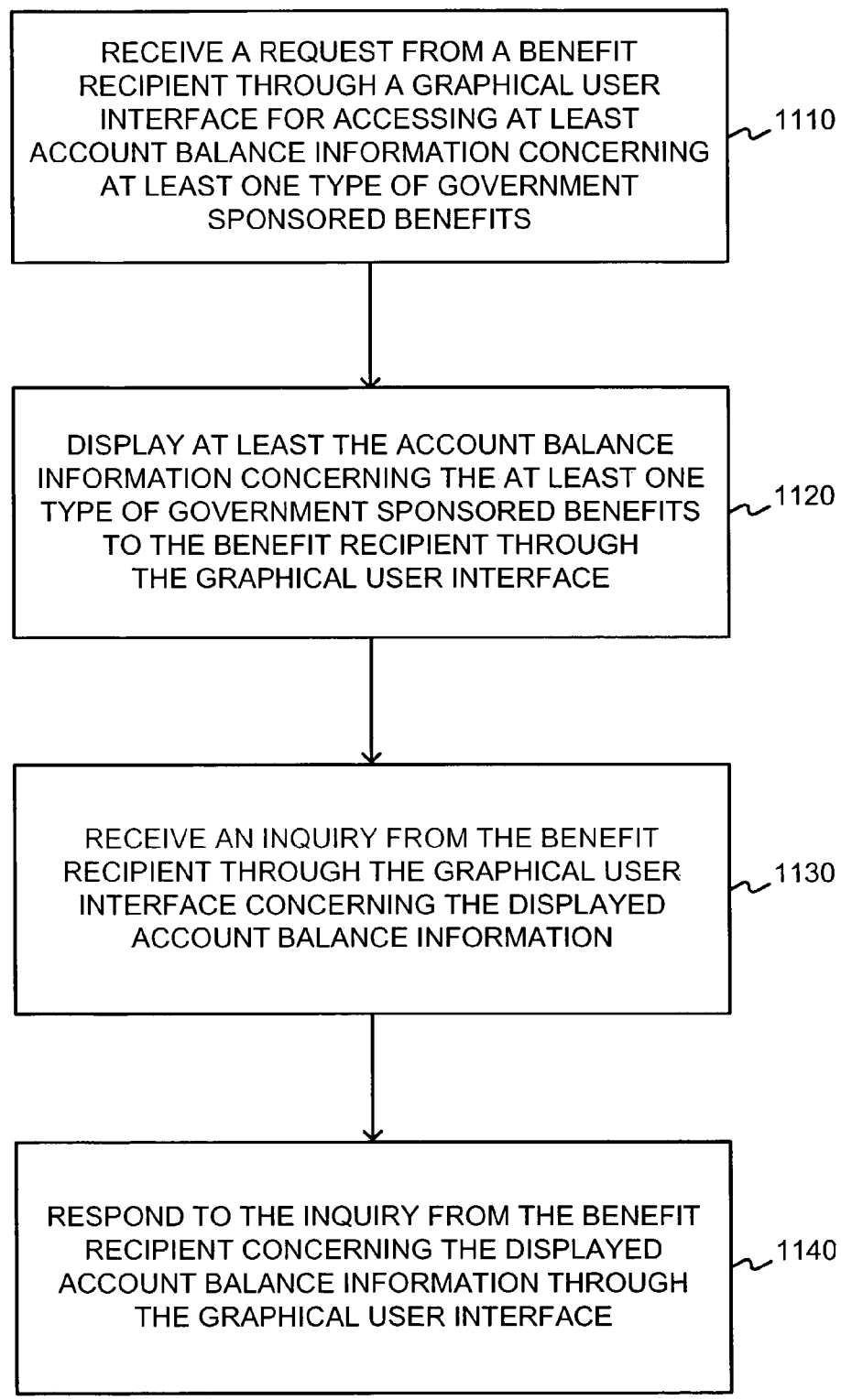
FIG. 11 is a flow diagram illustrating another exemplary method for processing government sponsored benefits consistent with methods and systems of the present invention.

FIG. 11 depicts a flow chart for another exemplary method for processing government sponsored benefits. The method may include benefits processing system 200 (of FIG. 1) receiving a request from a benefit recipient through a graphical user interface for accessing at least account balance information concerning at least one type of government sponsored benefits (step 1110). As discussed earlier, in one embodiment the graphical user interface may be a web browser.

Next, the benefits processing system may display the account balance information concerning the at least one type of government sponsored benefits to the benefit recipient through the graphical user interface (step 1120).

The benefits processing system may then receive an inquiry from the benefit recipient through the graphical user interface concerning the displayed account balance information (step 1130).

The benefits processing system may then respond to the inquiry from the benefit recipient concerning the displayed account balance information through the graphical user interface (step 1140). Although this response may be generated automatically by the benefits processing system, an operator may manually respond to the inquiry as well.

Additionally, the benefits processing system may display at least one electronic message concerning the inquiry to the benefit recipient through the graphical user interface. The at least one electronic mail message may be displayed in response to an inquiry from the benefit recipient. Alternatively, it may be displayed even without any inquiry from the benefit recipient. For example, the electronic message may provide updated information concerning benefits without being prompted by the benefit recipient.

Figure 12:
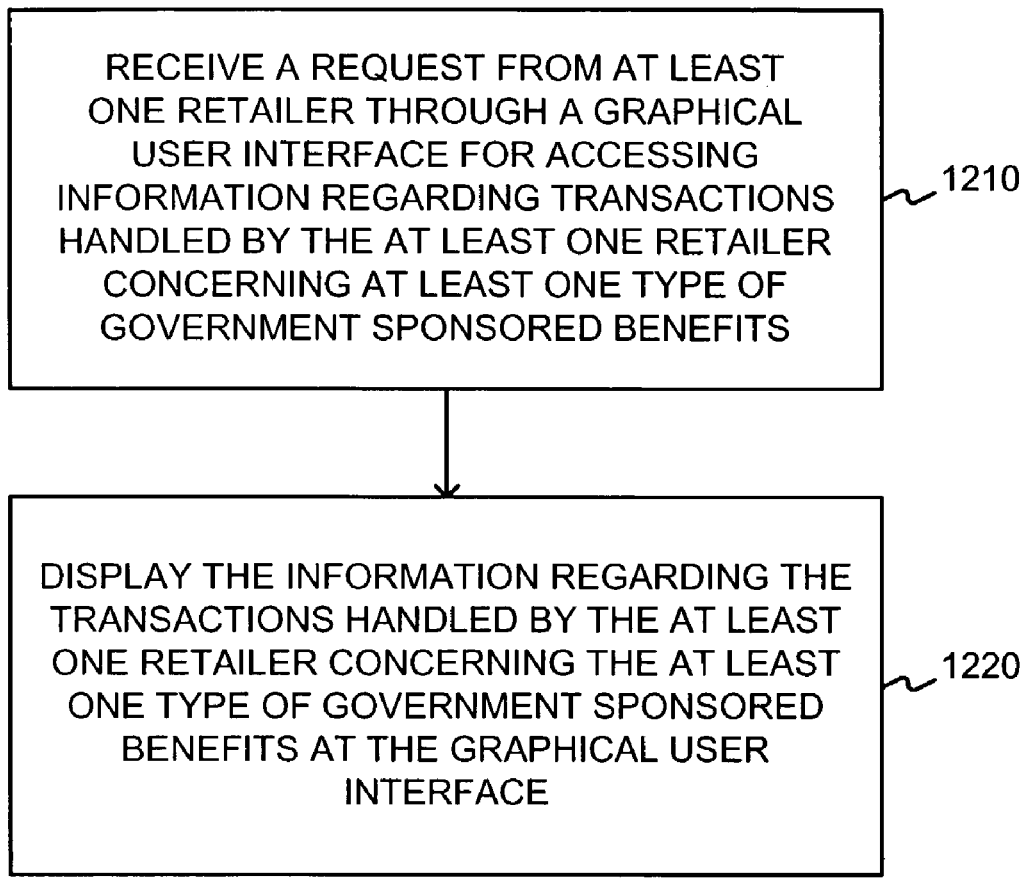
FIG. 12 is a flow diagram illustrating an exemplary method for managing government sponsored benefits consistent with methods and systems of the present invention.

Referring now to FIG. 12, FIG. 12 shows a flow chart for an exemplary method for managing government sponsored benefits. The exemplary method may include the benefits processing system receiving a request from at least one retailer through a graphical user interface for accessing information regarding transactions handled by the at least one retailer concerning at least one type of government sponsored benefits (step 1210). Thus, as part of this step, a retailer, such as a grocery store may access information regarding any transactions that were paid for using food stamps. In one embodiment, the retailer may access this information using a web browser. The government sponsored benefits may comprise at least one of food stamp benefits and cash benefits.

The method may further include displaying the information regarding the transactions handled by the at least one retailer concerning the at least one type of government sponsored benefits at the graphical user interface (step 1220). In one embodiment, information regarding the transactions handled by the at least one retailer may be displayed in a summary form. Additionally, detail information regarding at least one transaction handled by the at least one retailer concerning the at least one type of government sponsored benefits may be displayed.

Additionally, at least one retailer may be authorized to handle transactions concerning the at least one type of government sponsored benefits.

Further, an administrator or another authorized user may search information concerning the at least one retailer through the graphical user interface.

Figure 13:
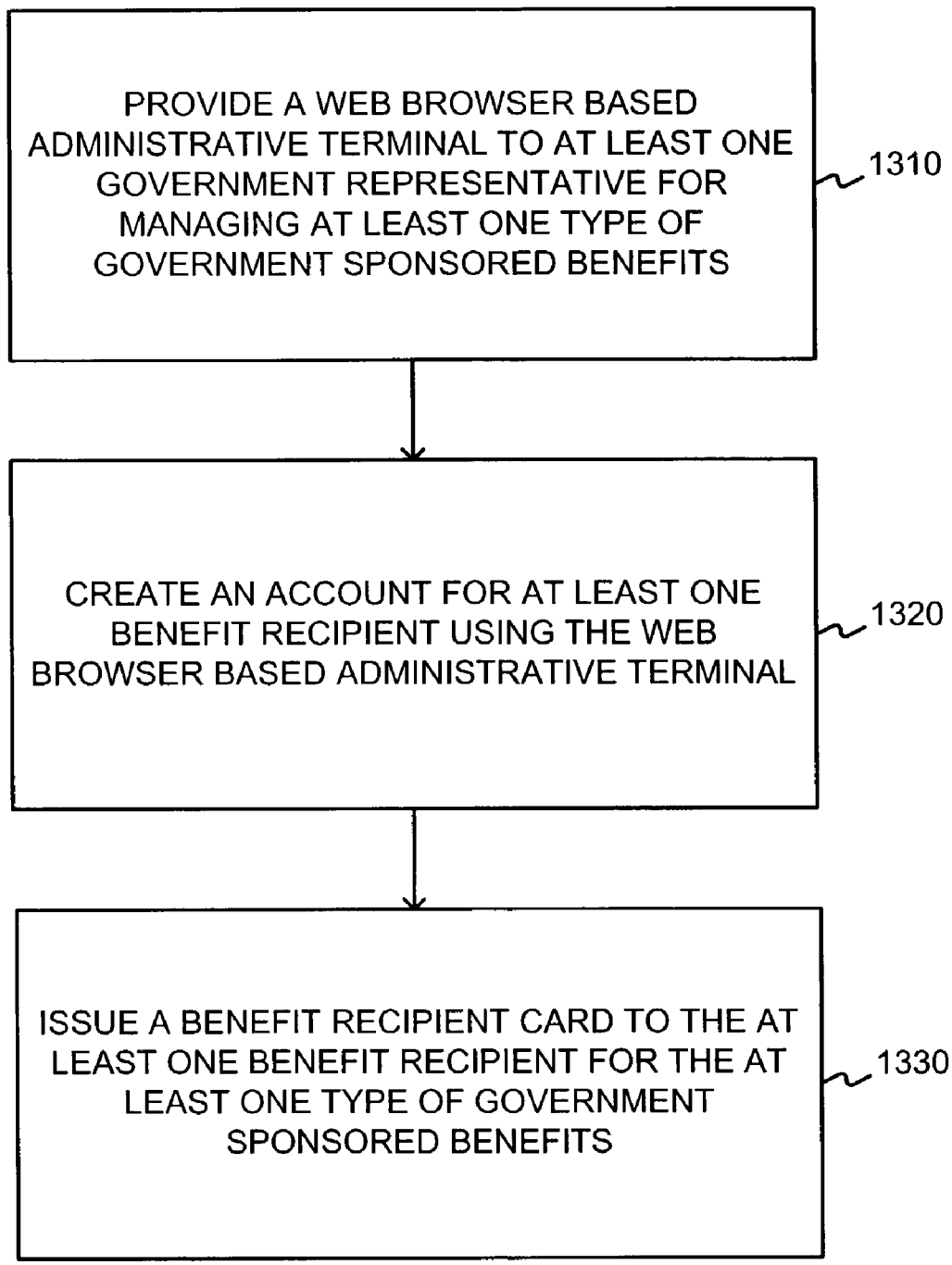
FIG. 13 is a flow diagram illustrating another exemplary method for managing government sponsored benefits consistent with methods and systems of the present invention.

FIG. 13 shows a flow chart for an exemplary method for managing government sponsored benefits. Consistent with the exemplary method, a web browser based administrator terminal may be provided to at least one government representative for managing at least one type of government sponsored benefits (step 1310). The government representative may be a federal, state, or county employee or anyone else authorized to manage the at least one type of government sponsored benefits.

The method may further include creating an account for at least one benefit recipient using the web browser based administrative terminal (step 1320).

Figure 5D:
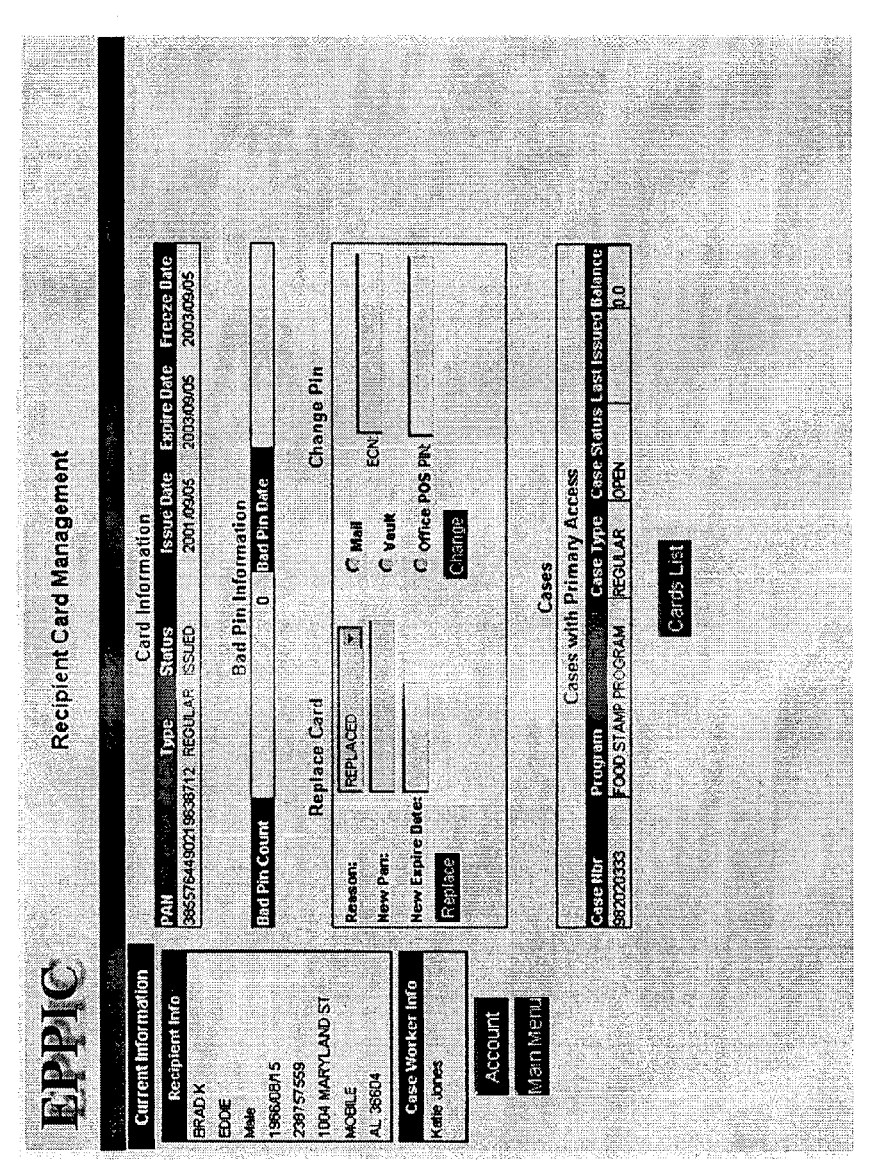

The method may further include issuing a benefit recipient card to the at least one benefit recipient for the at least one type of government sponsored benefits (step 1330). The benefit recipient card may be similar to a credit card, a smart card, or any other type of card and/or apparatus that may be used to access benefits-related information. Thus, for example, as shown in FIG. 5A, a new card may be issued. Similarly, as shown in FIGS. 5B and 5C, using card management component 252 (FIG. 3), an authorized user may replace a lost or damaged card. Further, as shown in FIG. 5D, the authorized user may associate a particular code, such as a PIN Code, with a card.

Further, the authorized user, for example, a county employee, may add at least one benefit program to the at least one type of government sponsored benefits. Alternatively, the authorized user may cancel at least one existing benefit program. Also, the authorized user may convert at least one benefit program to another benefit program. Also, as noted earlier, the at least one type of government sponsored benefits may be a food stamp benefit or a cash benefit.

Figure 14:
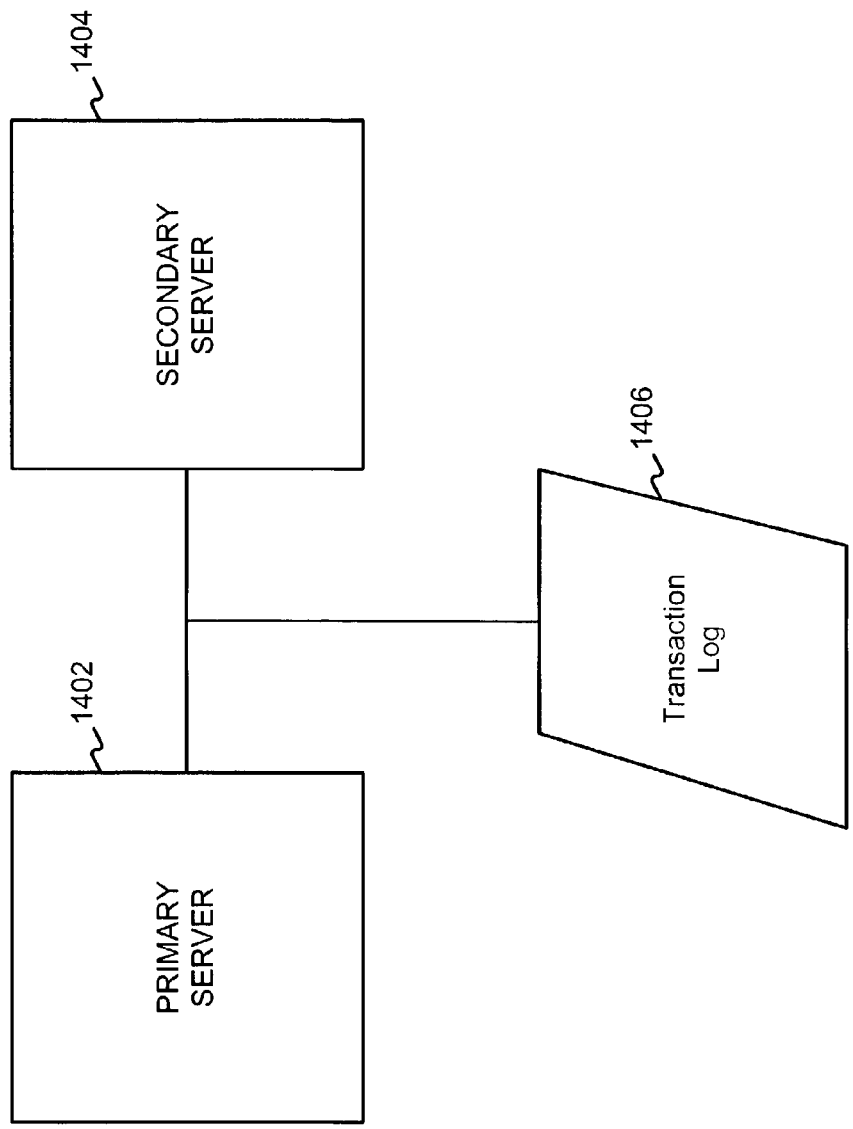
FIG. 14 is a schematic diagram illustrating a redundant arrangement for processing government sponsored benefits consistent with methods and systems of the present invention.

As shown in FIG. 2, benefits related information, such as account information may be stored on database server 204. Referring now to FIG. 14, an embodiment consistent with the present invention provides at least one primary server 1402 and at least one secondary server 1404. In one embodiment, each database transaction is committed to both the primary server and the secondary server. Also, at least one transaction log 1406 may be used to track each committed transaction. Although FIG. 14 shows only one primary server (or primary database server), one secondary server, and one log, as many of each may be implemented as needed consistent with the present invention.

Figure 15:
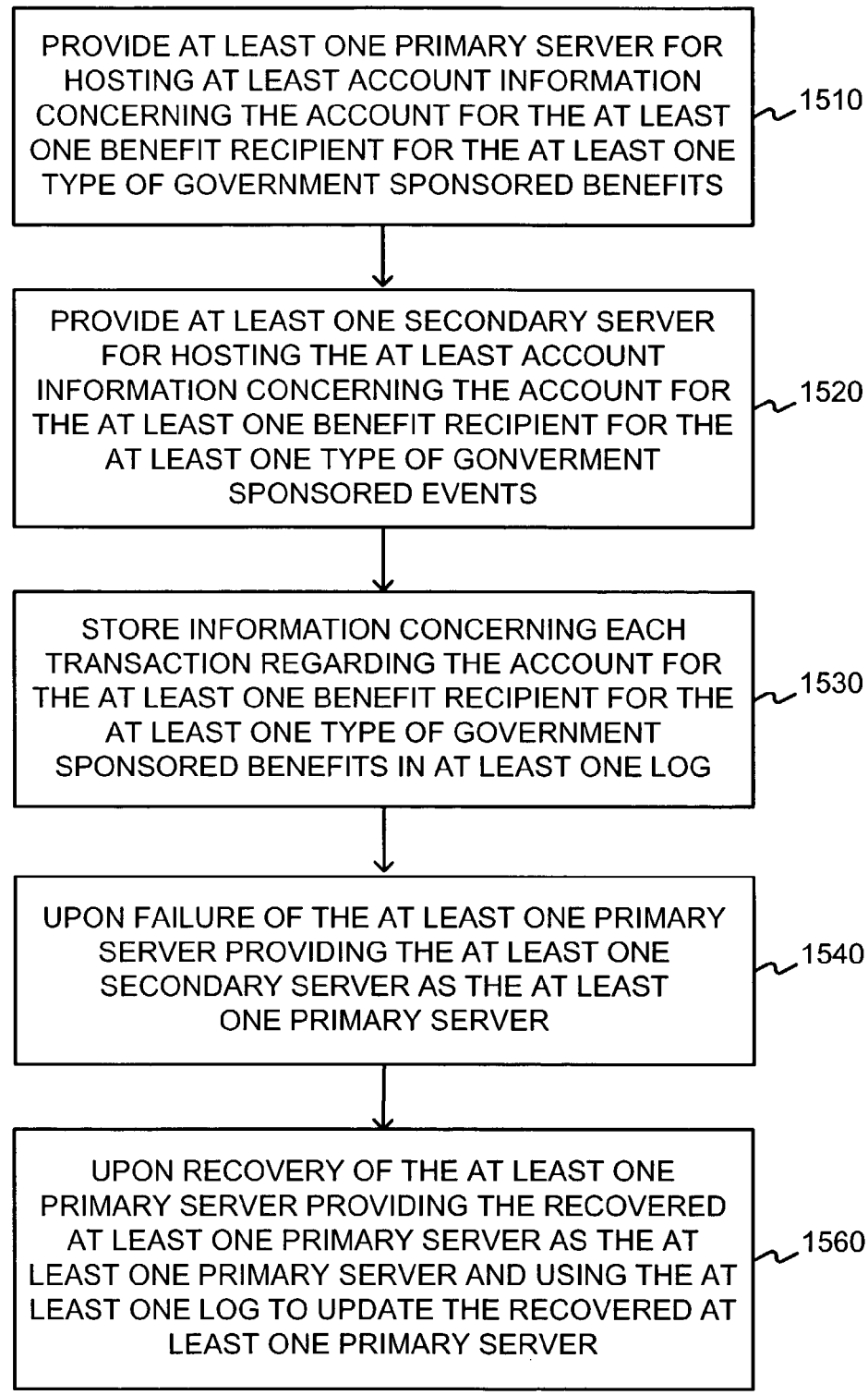
FIG. 15 is a flow diagram illustrating an exemplary method for providing a redundant arrangement for processing government sponsored benefits consistent with methods and systems of the present invention.

Referring now to FIG. 15, there is shown a method for managing government sponsored benefits using at least one primary server and at least one secondary server. The method includes providing at least one primary server for hosting at least account information concerning an account for at least one benefit recipient for at least one type of government sponsored benefits (step 1510). As used herein the term "hosting" includes, but is not limited to, having a database server for processing transactions related to the database server. Additionally, the primary server may be a centralized server or a distributed server.

The method further includes providing at least one secondary server for hosting the at least account information concerning the account for the at least one benefit recipient for the at least one type of government sponsored benefits (step 1520).

The method also includes storing information concerning each transaction regarding the account for the at least one benefit recipient for the at least one type of government sponsored benefits in at least one log (step 1530). The stored information may comprise each transaction, an index corresponding to each of the transactions, or any other type of information that may be used to update the recovered primary server.

Further, the method includes, upon failure of the at least one primary server, providing the at least one secondary server as the primary server (step 1540). Failure, as used herein, includes but is not limited to, a catastrophic failure, a hardware shutdown, a software exception, and/or any problem that may result in either inability or the degradation of the ability to handle transactions. Also, the secondary server may be switched as the primary server automatically or manually.

Next, upon recovery of the at least one primary server, the recovered at least one primary server is provided as the at least one primary server and the at least one log may be used to update the recovered at least one primary server. Updating may include reviewing the log and committing the missing transactions to the at least one primary server.

Figure 16:
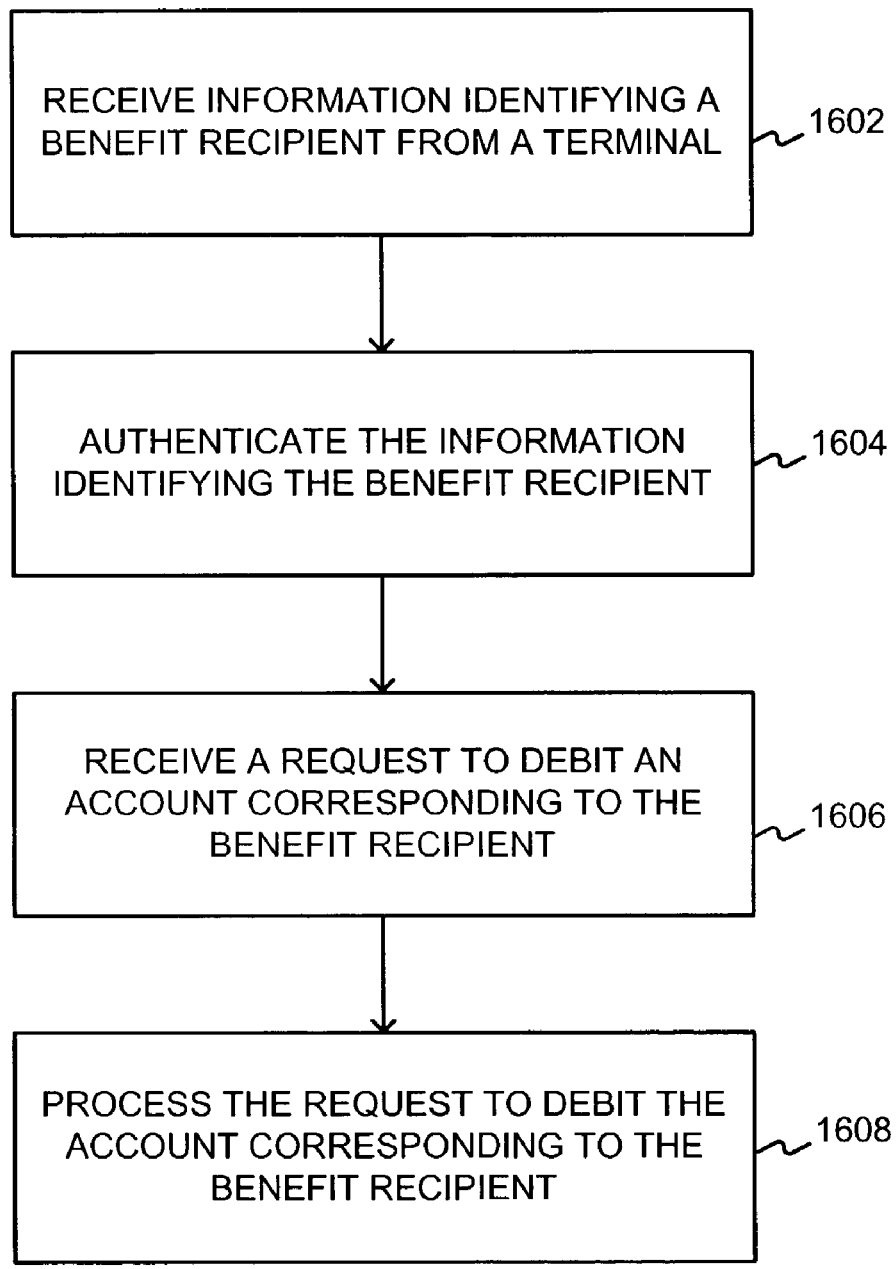
FIG. 16 is a flow diagram illustrating an exemplary method for providing access to government sponsored benefits consistent with methods and systems of the present invention.

FIG. 16 shows a flow diagram illustrating an exemplary method for providing access to government sponsored benefits. The exemplary method may include receiving information identifying a benefit recipient from a terminal (step 1602). The terminal may be a point of sale terminal, an automatic teller machine, and/or any other terminal that may be used to receive information. Further, the terminal may have a device, such as a card reader attached to it. The benefit recipient may swipe a benefit recipient card thereby providing information coded on, for example, a magnetic strip. Thus, for example, as shown in FIG. 9, among other things, information identifying the benefit recipient, for example a PAN 914, may be received. Also, consistent with the exemplary method, the benefit recipient may enter a PIN 916 (FIG. 9) code.

Next, the information identifying the benefit recipient may be authenticated (step 1604). Authentication may include verifying the benefit recipient's identity. It may further include determining the eligibility of the benefit recipient to receive a particular benefit.

The exemplary method, as shown in FIG. 16, may further include receiving a request to debit an account corresponding to the benefit recipient (step 1606). This information may be received before authenticating the information identifying the benefit recipient. Thus, both the information identifying the benefit recipient and the request to debit the account may be received before authentication.

Further, the exemplary method includes processing the request to debit the account corresponding to the benefit recipient (step 1608). This step may include debiting the account and recording the transaction for reporting purposes.

Other embodiments of the invention will be apparent to those skilled in the art from consideration of the specification and practice of the invention disclosed herein. For example, although the various embodiments have been described by referring to government sponsored benefits, they are applicable for benefits sponsored by private entities and/or benefits sponsored by a combination of private and public funds. Accordingly, it is intended that the specification and examples be considered as exemplary only, with a true scope and spirit of the invention being indicated by the following claims.

What is claimed is:

1. A method for managing government sponsored benefits, comprising:
   providing a web browser based administrative terminal to a government representative for managing government sponsored benefits;
   using the web browser based administrative terminal to perform the operations of:
      creating an account for a benefit recipient, the account including a plurality of different government sponsored benefit programs, including a cash benefit program;
      issuing a benefit card to the benefit recipient for accessing the plurality of different government sponsored benefit programs, including the cash benefit program;
      issuing a benefit under one of the plurality of different government sponsored benefit programs, wherein the benefit is accessible via the benefit card;
      converting an issued benefit into a benefit issued under a different one of the plurality of different government sponsored benefit programs, including converting a food stamp benefit into a cash benefit;
      replacing a lost or stolen benefit card; and
      canceling an existing government sponsored benefit corresponding to the benefit recipient.

2. The method of claim 1, further comprising:
   using the web browser based administrative terminal to authorize a retailer to handle transactions related to the government sponsored benefits.

3. The method of claim 1, further comprising:
using the web browser based administrative terminal to provide cash to the benefit recipient under the cash benefit program.

4. The method of claim 1, further comprising:
issuing a code corresponding to the benefit card to the benefit recipient associated with the benefit card.

5. The method of claim 1, further comprising:
providing a primary server for hosting account information associated with the benefit recipient.

6. The method of claim 5, further comprising:
providing a secondary server for hosting the account information associated with the benefit recipient.

7. The method of claim 6, further comprising:
storing information in a log for transactions associated with the account of the benefit recipient.

8. The method of claim 7, further comprising:
upon failure of the primary server, switching to the secondary server.

9. The method of claim 8, further comprising:
upon recovery of the failed primary server, designating the recovered primary server as the primary server and using the log to update the recovered primary server.

10. A computer system for managing government sponsored benefits, comprising:
a primary server for hosting account information associated with a benefit recipient;
a secondary server for hosting the account information associated with the benefit recipient;
a web browser based administrative terminal configured to display information to a user and receive information from the user;
a memory storing computer instructions; and
a processor, wherein the processor is configured to execute the computer instructions to provide the web browser based administrative terminal with functionality for:
creating an account for the benefit recipient, the account including a plurality of different government sponsored benefit programs, including a cash benefit program;
issuing a benefit card to the benefit recipient for accessing the plurality of different government sponsored benefit programs, including the cash benefit program;
issuing a benefit under one of the plurality of different government sponsored benefit programs, wherein the benefit is accessible via the benefit card;
converting an issued benefit into a benefit issued under a different one of the plurality of different government sponsored benefit programs, including converting a food stamp benefit into a cash benefit;
replacing a lost or stolen benefit card; and
canceling an existing government sponsored benefit corresponding to the benefit recipient.

11. The computer system of claim 10, wherein the web browser based administrative terminal further includes functionality for:
authorizing a retailer to handle transactions related to the government sponsored benefits.

12. The computer system of claim 10, wherein the web browser based administrative terminal further includes functionality for:
providing cash to the benefit recipient under the cash benefit program.

13. The computer system of claim 10, wherein the processor is further configured to:
issue a code corresponding to the benefit recipient card to the benefit recipient associated with the benefit card.

14. The computer system of claim 10, further comprising:
a log for storing information for transactions associated with the account of the benefit recipient.

15. The computer system of claim 14, wherein the processor is further configured to:
switch to the secondary server upon failure of the primary server.

16. The computer system of claim 15, wherein the processor is further configured to:
designate the recovered primary server as the primary server and use the log to update the recovered primary server upon recovery of the failed primary server.

17. The computer system of claim 10, wherein the processor is further configured to:
automatically process a benefit recipient account setup file, a benefit recipient account update file, and a benefit recipient update file.

18. The computer system of claim 17, wherein the operation of automatically processing a file further includes:
acknowledging a receipt of the file;
validating a format of the file; and
processing records located in the file.

19. A system for managing government sponsored benefits, comprising:
means for allowing a government representative to manage government sponsored benefits;
means for creating an account for a benefit recipient, the account including a plurality of different government sponsored benefit programs, including a cash benefit program;
means for issuing a benefit card to the benefit recipient for accessing the plurality of different government sponsored benefit programs, including the cash benefit program;
means for issuing a benefit under one of the plurality of different government sponsored benefit programs, wherein the benefit is accessible via the benefit card;
means for converting an issued benefit into a benefit issued under a different one of the plurality of different government sponsored benefit programs, including converting a food stamp benefit into a cash benefit;
means for replacing a lost or stolen benefit card;
means for cancelling an existing government sponsored benefit corresponding to the benefit recipient.

20. A computer-readable medium containing instructions that, when executed by a computer system, provide functionality allowing for a government representative to use a web browser based administrative terminal to manage government sponsored benefits, including the operations of:
creating an account for a benefit recipient, the account including a plurality of different government sponsored benefit programs, including a cash benefit program;
issuing a benefit card to the benefit recipient for accessing the plurality of different government sponsored benefit programs, including the cash benefit program;
issuing a benefit under one of the plurality of different government sponsored benefit programs, wherein the benefit is accessible via the benefit card;
converting an issued benefit into a benefit issued under a different one of the plurality of different government sponsored benefit programs, including converting a food stamp benefit into a cash benefit;
replacing a lost or stolen benefit card; and
canceling an existing government sponsored benefit corresponding to the benefit recipient.

* * * * *